(12) United States Patent
Morimoto

(10) Patent No.: US 8,493,577 B2
(45) Date of Patent: Jul. 23, 2013

(54) CONTROL DEVICE, IMAGE FORMING APPARATUS, PRINTING SYSTEM, CONTROL METHOD, AND CONTROL PROGRAM

(75) Inventor: Tsuyoshi Morimoto, Itami (JP)

(73) Assignee: Konica Minolta Business Technologies, Inc, Chiyoda-Ku, Tokyo (JP)

( * ) Notice: Subject to any disclaimer, the term of this patent is extended or adjusted under 35 U.S.C. 154(b) by 1196 days.

(21) Appl. No.: 12/010,429

(22) Filed: Jan. 24, 2008

(65) Prior Publication Data
US 2008/0186524 A1    Aug. 7, 2008

(30) Foreign Application Priority Data
Feb. 1, 2007    (JP) .................................. 2007-022816

(51) Int. Cl.
G06F 3/12      (2006.01)
G06F 13/00     (2006.01)
G06F 21/00     (2013.01)
H04N 1/46      (2006.01)

(52) U.S. Cl.
USPC .......... 358/1.13; 358/1.9; 358/1.15; 358/524; 358/501; 711/164

(58) Field of Classification Search
USPC .......... 358/1.9, 1.13, 1.15, 524, 501; 711/164
See application file for complete search history.

(56) References Cited

U.S. PATENT DOCUMENTS

| | | | |
|---|---|---|---|
| 6,226,472 B1 * | 5/2001 | Yun | 399/81 |
| 6,268,925 B1 | 7/2001 | Yamanaka | |
| 6,813,037 B1 * | 11/2004 | Collard | 358/1.15 |
| 7,965,401 B2 * | 6/2011 | Ishimaru | 358/1.14 |
| 7,982,889 B2 * | 7/2011 | Okada | 358/1.14 |
| 2002/0001100 A1 * | 1/2002 | Kawanabe | 358/1.15 |
| 2002/0041389 A1 | 4/2002 | Noda | |

(Continued)

FOREIGN PATENT DOCUMENTS

| | | |
|---|---|---|
| JP | 10-171633 A | 6/1998 |
| JP | 11-5350 A | 1/1999 |

(Continued)

OTHER PUBLICATIONS

Notice of Ground of Rejection in JP 2007-022816 dated Feb. 3, 2009, and an English Translation thereof.

(Continued)

Primary Examiner — King Poon
Assistant Examiner — Beniyam Menberu
(74) Attorney, Agent, or Firm — Buchanan Ingersoll & Rooney PC

(57) ABSTRACT

In order to reduce power consumption and shorten the waiting time until printing, the PC, controlling the MFP that is maintained in a sleep mode instead of being switched to a standby mode when a print job having a printing method set to confidential printing is received while it is in the sleep mode, includes a setting accepting portion to accept setting for printing, a job generating portion to generate a print job based on the accepted setting, a job transmitting portion to transmit the generated print job to the MFP, and a command transmitting portion to transmit a wake-up command to switch the MFP to the standby mode when the setting of the confidential printing as the printing method is accepted and when there is a wake-up instruction.

9 Claims, 15 Drawing Sheets

U.S. PATENT DOCUMENTS

| | | | |
|---|---|---|---|
| 2002/0178389 A1* | 11/2002 | Satoh | 713/310 |
| 2003/0056133 A1* | 3/2003 | Talley | 713/323 |
| 2004/0213615 A1* | 10/2004 | Nakao | 400/76 |
| 2006/0269341 A1* | 11/2006 | Aoki et al. | 400/62 |
| 2007/0216947 A1* | 9/2007 | Jager et al. | 358/1.15 |
| 2008/0007767 A1* | 1/2008 | Ishimaru | 358/1.15 |
| 2010/0188698 A1* | 7/2010 | Koizumi | 358/1.15 |

FOREIGN PATENT DOCUMENTS

| | | | |
|---|---|---|---|
| JP | 11-085420 | * | 3/1999 |
| JP | 2000-250732 | | 9/2000 |
| JP | 2002-182887 A | | 6/2002 |
| JP | 2002-229394 A | | 8/2002 |
| JP | 2003-341190 | | 12/2003 |
| JP | 2004-112051 | * | 4/2004 |
| JP | 2004-272596 A | * | 9/2004 |
| JP | 2004-295640 A | | 10/2004 |
| JP | 2005-335255 | | 12/2005 |
| JP | 2005-343089 | * | 12/2005 |

OTHER PUBLICATIONS

Notice of Allowance in JP 2007-022816 dated May 26, 2009, and an English Translation thereof.

* cited by examiner

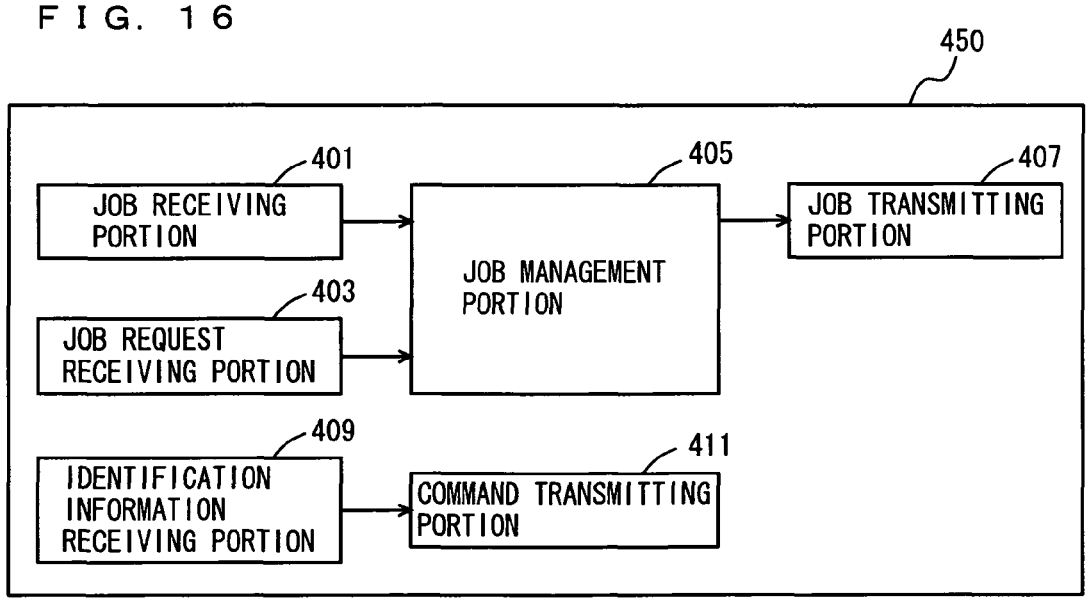

ized by the identification information to attain a printable state.
CONTROL DEVICE, IMAGE FORMING APPARATUS, PRINTING SYSTEM, CONTROL METHOD, AND CONTROL PROGRAM This application is based on Japanese Patent Application No. 2007-22816 filed with Japan Patent Office on Feb. 1, 2007, the entire content of which is hereby incorporated by reference.

BACKGROUND OF THE INVENTION

1. Field of the Invention

The present invention relates to a control device, an image forming apparatus, a printing system, a control method, and a control program, and more particularly to a control device for controlling an image forming apparatus, an image forming apparatus controlled by the same, a printing system including them, and a control method and a control program executed therein.

2. Description of the Related Art

In recent years, a printer or other image forming apparatus enters a state unready for printing and consuming less power (hereinafter, referred to as "sleep mode") in order to decrease power consumption if it does not operate for a predetermined period of time. The image forming apparatus, in receipt of printer data from a computer, returns from the sleep mode to a state ready for printing (hereinafter, referred to as "standby mode"), to print out the print data. A certain time is required for switching from the sleep mode to the standby mode, which increases the time until the printing is finished. To address this problem, there is known a technique to transmit a command (hereinafter, referred to as "wake-up command") to cause the apparatus to return to the standby mode before setting for printing is made by the computer. The wake-up command is transmitted, e.g., upon activation of a printer driver.

Meanwhile, there is known an image forming apparatus provided with a so-called confidential printing function, wherein upon reception of print data from a computer, the print data is temporarily stored without being printed, and thereafter, it is printed on the condition that there is an instruction from a user. This is because the user who instructed confidential printing may not instruct the image forming apparatus to print the same immediately. If the operating mode is switched from the sleep mode to the standby mode upon reception of the print data for confidential printing, power may be wasted in the image forming apparatus until (and after) it attains the standby mode. The same applies to the case of transmitting a wake-up command.

When the image forming apparatus is in the sleep mode, preparation for returning to the standby mode is initiated only after the instruction to print the print data for confidential printing is input to an operation portion. This would increase the waiting time, in addition to the printing time of the image forming apparatus, to wait for the operating mode to be switched from the sleep mode to the standby mode.

SUMMARY OF THE INVENTION

The present invention has been accomplished in view of the foregoing problems, and an object of the present invention is to provide a control device, a control method and a control program capable of shortening the waiting time for an image forming apparatus to perform printing, while reducing the power consumed by the image forming apparatus.

Another object of the present invention is to provide an image forming apparatus, a control method and a control program capable of reducing power consumption.

A further object of the present invention is to provide a printing system and a control method capable of shortening the waiting time for an image forming apparatus to perform printing, while reducing the power consumed by the image forming apparatus.

In order to achieve the above objects, according to an aspect of the present invention, there is provided a control device for controlling an image forming apparatus having operating modes of a standby mode ready for printing and a sleep mode unready for printing and consuming less power than in the standby mode, in which when a print job having a printing method set to confidential printing, where printing is performed only after reception of a prescribed instruction, is received while the operating mode is switched to the sleep mode, the sleep mode is maintained instead of being switched to the standby mode, wherein the control device includes: a setting portion to accept setting for printing; a generating portion to generate a print job based on the accepted setting; a transmitting portion to transmit the generated print job to the image forming apparatus; and a control portion, when the setting of the confidential printing as the printing method is accepted by the setting portion and when a predetermined condition is satisfied, to control to switch the operating mode of the image forming apparatus to the standby mode.

According to another aspect of the present invention, there is provided an image forming apparatus, which includes: a receiving portion to externally receive a print job; and a switching portion to switch an operating mode to one of a standby mode ready for printing and a sleep mode unready for printing and consuming less power than in the standby mode, wherein when a print job having a printing method set to confidential printing, where printing is performed only after reception of a prescribed instruction, is received while the operating mode is switched to the sleep mode, the switching portion maintains the sleep mode, instead of switching the operating mode to the standby mode.

According to a further aspect of the present invention, there is provided a printing system composed of at least one client and a server for controlling a plurality of image forming apparatuses, wherein each of the at least one client includes: a setting portion to accept setting for printing; a generating portion to generate a print job based on the accepted setting; and a first transmitting portion to transmit the generated print job to the server; wherein the server includes: a storage portion to store the print job received from at least one of the at least one client; and a second transmitting portion, when transmission of the stored print job is requested from one of the plurality of image forming apparatuses, to transmit the print job to the image forming apparatus that requested the transmission of the print job; wherein each of the at least one client further includes: a selection accepting portion to accept selection of one of the plurality of image forming apparatuses when setting of confidential printing as a printing method, where printing is performed only after reception of a prescribed instruction, is accepted by the setting portion; and an apparatus transmitting portion to transmit identification information for identifying the selected image forming apparatus to the server; and wherein the server further includes: a control portion, upon reception of the identification information from at least one of the at least one client, to control the image forming apparatus specified by the identification information to attain a printable state.

According to a still further aspect of the present invention, there is provided a control method executed in a control device for controlling an image forming apparatus having operating modes of a standby mode ready for printing and a sleep mode unready for printing and consuming less power than in the standby mode, in which when a print job having a printing method set to confidential printing, where printing is performed only after reception of a prescribed instruction, is received while the operating mode is switched to the sleep mode, the sleep mode is maintained instead of being switched to the standby mode, wherein the method includes the steps of: accepting setting for printing; generating a job based on the accepted setting; transmitting the generated job to the image forming apparatus; and controlling to switch the operating mode of the image forming apparatus to the standby mode when the setting of the confidential printing as the printing method is accepted in the step of accepting the setting and when a predetermined condition is satisfied.

According to yet another aspect of the present invention, there is provided a control method which includes the steps of: externally receiving a print job; switching an operating mode to one of a standby mode ready for printing and a sleep mode unready for printing and consuming less power than in the standby mode; and when a print job having a printing method set to confidential printing where printing is performed only after reception of a prescribed instruction is received while the operating mode is switched to the sleep mode, maintaining the sleep mode instead of switching the operating mode to the standby mode.

According to a further aspect of the present invention, there is provided a control method executed by at least one client and a server for controlling a plurality of image forming apparatuses, wherein the method causes each of the at least one client to execute the steps of accepting setting for printing; generating a print job based on the accepted setting; and transmitting the generated print job to the server; wherein the method causes the server to execute the steps of: storing the print job received from at least one of the at least one client; and when transmission of the stored print job is requested from one of the plurality of image forming apparatuses, transmitting the print job to the image forming apparatus that requested the transmission of the print job; wherein the method causes each of the at least one client to further execute the steps of: when setting of confidential printing as a printing method where printing is performed only after reception of a prescribed instruction is accepted in the step of accepting the setting, selecting one of the plurality of image forming apparatuses; and transmitting identification information for identifying the selected image forming apparatus to the server; and wherein the method causes the server to further execute the step of: when receiving the identification information from at least one of the at least one client, controlling the image forming apparatus specified by the identification information to attain a printable state.

According to a still further aspect of the present invention, there is provided a control program for a control device for controlling an image forming apparatus having operating modes of a standby mode ready for printing and a sleep mode unready for printing and consuming less power than in the standby mode, in which when a print job having a printing method set to confidential printing, where printing is performed only after reception of a prescribed instruction, is received while the operating mode is switched to the sleep mode, the sleep mode is maintained instead of being switched to the standby mode, wherein the control program is embodied on a computer readable medium for causing the control device to execute processing including the steps of: accepting setting for printing; generating a job based on the accepted setting; transmitting the generated job to the image forming apparatus; and when setting of the confidential printing as the printing method is accepted in the step of accepting the setting and when a predetermined condition is satisfied, controlling the image forming apparatus to attain a printable state.

According to yet another aspect of the present invention, there is provided a control program embodied on a computer readable medium for causing a computer to execute processing including the steps of: externally receiving a print job; switching an operating mode to one of a standby mode ready for printing and a sleep mode unready for printing and consuming less power than in the standby mode; and maintaining the sleep mode, instead of switching the operating mode to the standby mode, when a print job having a printing method set to confidential printing where printing is performed only after reception of a prescribed instruction is received while the operating mode is switched to the sleep mode.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 shows an example of a printer selection screen.

FIG. 16 is a functional block diagram schematically showing the function of a print server.

DESCRIPTION OF THE PREFERRED EMBODIMENTS

Figure 1:
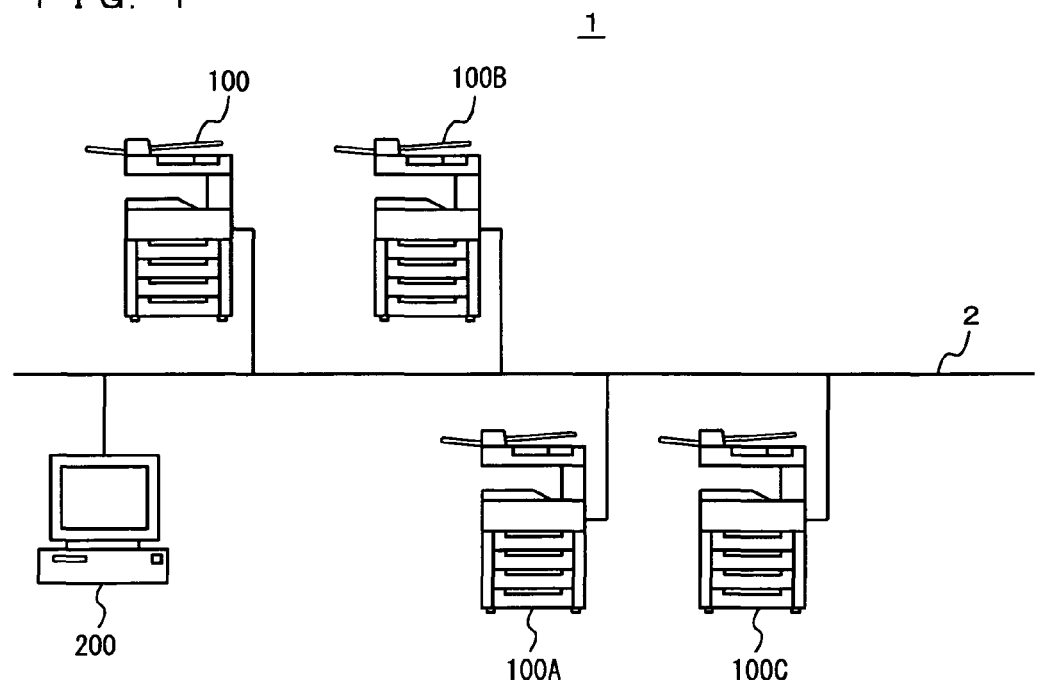
FIG. 1 is a schematic diagram of a printing system according to a first embodiment of the present invention.

Embodiments of the present invention will now be described with reference to the drawings. In the following description, like reference characters denote like parts, which have like names and functions, and therefore, detailed description thereof will not be repeated.

<First Embodiment>

FIG. 1 schematically shows a printing system according to a first embodiment of the present invention. Referring to FIG. 1, a printing system 1 includes multi-function peripherals (hereinafter, "MFPs") 100, 100A, 100B, and 100C, and a personal computer (hereinafter, "PC") 200, which are connected to a network 2.

MFPs 100, 100A, 100B, and 100C are image forming apparatuses, which are identical in configuration and function, and therefore, MFP 100 will be explained as an example, unless otherwise stated.

Network 2 is a local area network (LAN), which may be wired or wireless. However, not restricted thereto, network 2 may be a wide area network (WAN), the Internet, a network using public line, or the like.

PC 200, which is a common computer, serves as a control device controlling MFPs 100, 100A, 100B, and 100C. Further, PC 200 has a printer driver program, which is a control program, installed therein. If MFPs 100, 100A, 100B, and 100C differ in type from each other, four types of driver programs are installed in PC 200 to respectively control MFPs 100, 100A, 100B, and 100C. As the printer driver program is executed in PC 200, PC 200 transmits a print job, including data generated by executing another application program different from the printer driver program, to any of MFPs 100, 100A, 100B, and 100C. The print job includes print data and a print condition.

The print data corresponds to the data generated by execution of the application program and converted into a format that can be printed by MFPs 100, 100A, 100B, and 100C. For example, it is the data described in PCL (Printer Control Language) or other PDL (Page Description Language). The print condition is data described, e.g., in PJL (Printer Job Language). The print condition includes a password designated by a user when the printing method has been set as confidential printing. For example, when PC 200 transmits a print job having the printing method set to confidential printing, MFP 100 temporarily stores the print job and, on the condition that the password is input (i.e., when there is a prescribed instruction), forms an image based on the print data according to the print condition.

In the following, the case where PC 200 transmits a print job to MFP 100 will be described unless otherwise stated. In this case, MFP 100 serves as a printer. Thus, the word "printer" in the following explanation refers to any of MFPs 100, 100A, 100B, and 100C.

Although one PC 200 is shown in FIG. 1, not limited thereto, one or more PCs may be connected to network 2.

Figure 2:
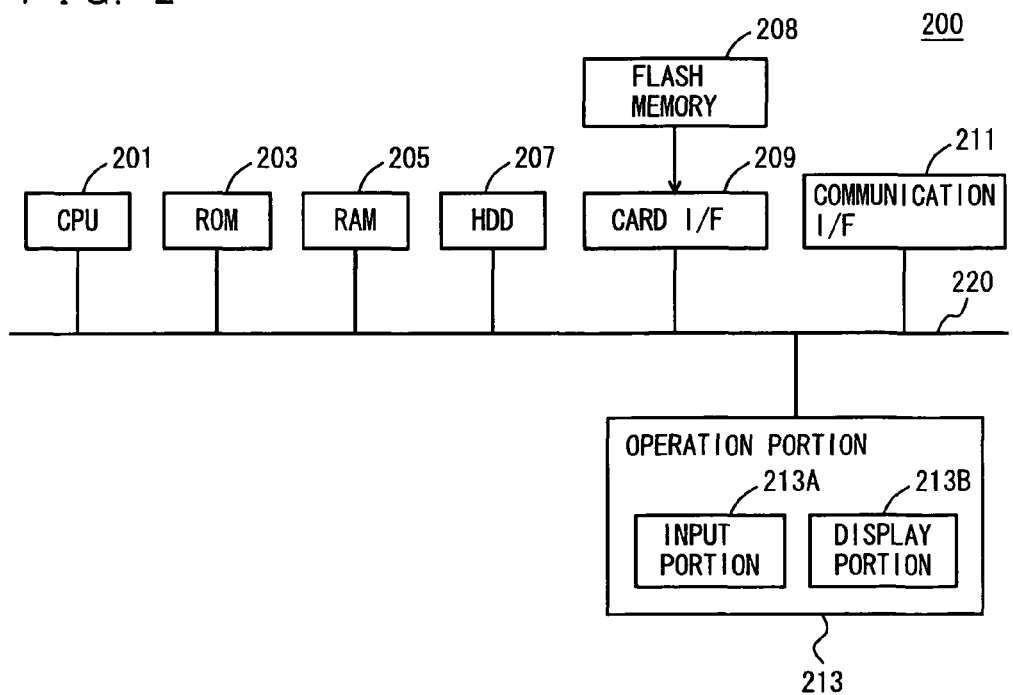
FIG. 2 is a block diagram showing an example of the hardware configuration of a PC according to the embodiment.

FIG. 2 is a block diagram showing an example of the hardware configuration of PC 200 according to the present embodiment. Referring to FIG. 2, PC 200 includes: a central processing unit (CPU) 201; a read only memory (ROM) 203 having a program executed by CPU 201 or the like recorded thereon; a random access memory (RAM) 205 for loading a program to be executed and for storing data for which the program is being executed; a hard disk drive (HDD) 207 for storing data in a non-volatile manner; a card interface (I/F) 209 mounted with a flash memory 208; a communication I/F 211 connecting PC 200 to network 2; and an operation portion 213 serving as an interface with the user.

CPU 201 loads a printer driver program (control program) recorded on flash memory 208 mounted to card I/F 209 to RAM 205 for execution. The program executed by CPU 201 is not limited to the printer driver program recorded on flash memory 208. A program stored in HDD 207 may be loaded to RAM 205 for execution. In this case, another computer connected to network 2 may rewrite the printer driver program stored in HDD 207 of PC 200, or may additionally write a new printer driver program. Further, PC 200 may download the printer driver program from another computer connected to network 2 and store the same in HDD 207. As used herein, the "program" includes, not only the program directly executable by CPU 201, but also a source program, a compressed program, an encrypted program, and others.

Operation portion 213 includes an input portion 213A and a display portion 213B. Input portion 213A is an input device such as a keyboard, mouse and the like for accepting an input of operation by a user of PC 200. Display portion 213B is a display device such as a liquid crystal display, an organic electro-luminescence (EL) display panel, a cathode ray tube (CRT) or the like. A pointing device such as a touch panel may be used for input portion 213A.

Communication I/F 211 is a communication interface for connecting PC 200 to network 2, and allows communication between PC 200 and MFPs 100, 100A, 100B, and 100C. While PC 200 and MFPs 100, 100A, 100B, and 100C are connected via network 2, they may directly be connected using a serial interface or a parallel interface. As communication I/F 211, an interface conforming to the connection manner between PC 200 and MFPs 100, 100A, 100B, and 100C is used.

Figure 3:
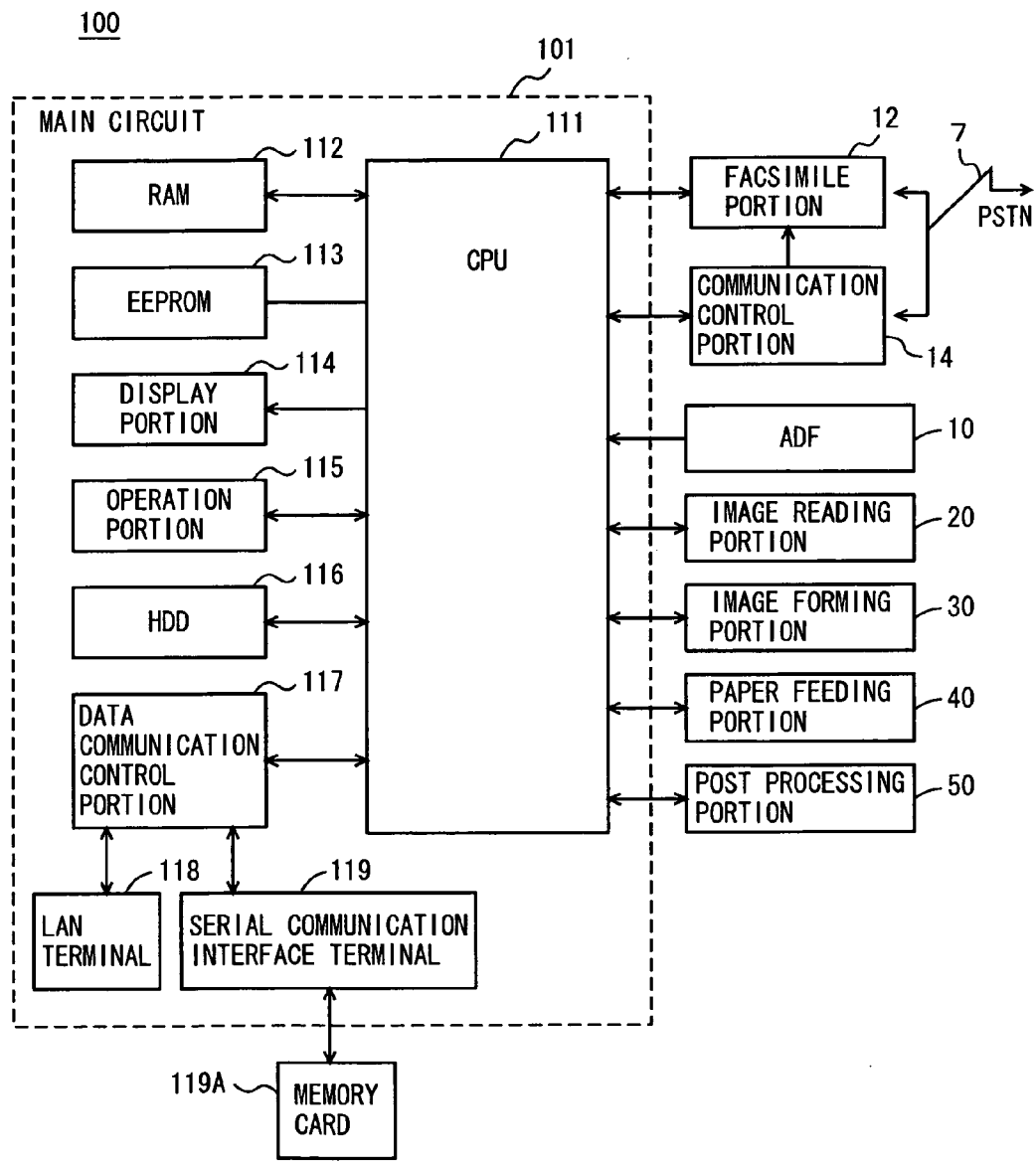
FIG. 3 is a block diagram showing an example of the hardware configuration of an MFP according to the embodiment.

FIG. 3 is a block diagram showing an example of the hardware configuration of MFP 100 in the present embodiment. Since MFPs 100A, 100B, and 100C each have the hard configuration identical to that of MFP 100, description thereof will not be repeated. Referring to FIG. 3, MFP 100 includes a main circuit 101, a facsimile portion 12, a communication control portion 14, an automatic document feeder (ADF) 10, an image reading portion 20, an image forming portion 30, a paper feeding portion 40, and a post processing portion 50.

Main circuit 101 includes a CPU 111, a RAM 112 used as a working area for CPU 111, an EEPROM (Electronically Erasable Programmable ROM) 113 for storing a program executed by CPU 111 and the like, a display portion 114, an operation portion 115, an HDD 116 as a mass storage, and a data communication control portion 117.

CPU 111 is connected with display portion 114, operation portion 115, HDD 116, and data communication control portion 117, and is responsible for overall control of main circuit 101. CPU 111 is also connected with facsimile portion 12, communication control portion 14, ADF 10, image reading portion 20, image forming portion 30, paper feeding portion 40, and post processing portion 50, and is responsible for overall control of MFP 100.

ADF 10 delivers a plurality of originals mounted on an original platform one by one to image reading portion 20. In response, image reading portion 20 reads image information of photograph, character, picture and the like from the original in an optical manner to acquire image data.

Image forming portion 30, in receipt of the image data, forms an image on a sheet of paper based on the image data. Image forming portion 30 forms the image using toners of four colors of cyan, magenta, yellow, and black, to achieve full color printing. Alternatively, it may use one type of toner for monochrome printing. Paper feeding portion 40 stores sheets of paper, and supplies them one by one to image forming portion 30. Post processing portion 50 discharges the sheet having the image formed thereon. Post processing portion 50 has a plurality of discharge trays to allow sorting of the recording sheets for discharge. Further, post printing portion 50 has a hole-punching portion and a stapler portion to enable hole-punching or stapling of the discharged recording sheets.

Display portion 114 is a display such as a liquid crystal display (LCD), an organic electro-luminescence display (ELD) or the like, and displays an instruction menu for the user, information about acquired image data, and others. Operation portion 115 is provided with a plurality of keys, and accepts input of data such as instructions, characters and numerical characters, according to the key operations of the user. Operation portion 115 includes a touch panel provided on display portion 114. Display portion 114 and operation portion 115 constitute an operation panel.

Data communication control portion 117 includes a LAN terminal 118 that is an interface for communication according to a communication protocol such as TCP (Transmission Control Protocol) or FTP (File Transfer Protocol), and a serial communication interface terminal 119 for serial communication. Data communication control portion 117 transmits and receives data to and from an external apparatus connected to LAN terminal 118 or serial communication interface terminal 119, in accordance with an instruction from CPU 111.

CPU 111 controls data communication control portion 117 to read a control program to be executed by CPU 111 from memory card 119A, and loads the read control program to RAM 112 for execution. It is noted that the recording medium for storing the program to be executed by CPU 111 is not restricted to memory card 119A. It may be a flexible disk, a cassette tape, an optical disc (CD-ROM (Compact Disc-ROM), MO (Magnetic Optical Disc), MD (Mini Disc), DVD (Digital Versatile Disc)), an IC card, an optical card, or a semiconductor memory such as a masked ROM, an EPROM (Erasable Programmable ROM), an EEPROM (Electronically EPROM), or the like. Alternatively, CPU 111 may download the program from a computer connected to the Internet and store the same in HDD 116, or a computer connected to the Internet may write the program to HDD 116, and thereafter, the program stored in HDD 116 may be loaded to RAM 112 for execution by CPU 111. As used herein, the "program" includes, not only the program directly executable by CPU 111, but also a source program, a compressed program, an encrypted program, and others.

Communication control portion 14 is a modem for connecting CPU 111 to a public switched telephone networks (PSTN) 7. MFP 100 is assigned a telephone number in PSTN 7 in advance. When there is a call from a facsimile machine connected to PSTN 7 to the telephone number assigned to MFP 100, communication control portion 14 detects the call. Upon detection of the call, communication control portion 14 establishes the call to enable communication of facsimile portion 12.

Facsimile portion 12 is connected to PSTN 7, and transmits facsimile data to or receives facsimile data from PSTN 7. Facsimile portion 12 converts the received facsimile data to print data that can be printed by image forming portion 30, and outputs the same to image forming portion 30. In response, image forming portion 30 prints the facsimile data received by facsimile portion 12 onto a sheet of paper. Further, facsimile portion 12 converts the data stored in HDD 116 to facsimile data, and outputs the same to a facsimile machine or another MFP connected to PSTN 7. In this manner, it is possible to output the data stored in HDD 116 to a facsimile machine or other MFPs 100A, 100B, and 100C. As such, MFP 100 has the facsimile transmitting/receiving function.

When MFP 100 receives no operating instruction for a predetermined period of time, MFP 100 is switched from the state ready for printing (i.e., "standby mode") to the state unready for printing and consuming less power than in the standby mode (i.e., "sleep mode"), in order to reduce power consumption. The operating instruction is issued when the user inputs an operation, and also when a print job is received from PC 200 connected to network 2, or the like.

Image forming portion 30 of MFP 100 is provided with a fixing roller for melting a toner image formed with toner on the sheet of paper for fixation. In the standby mode, MFP 100 controls the temperature of the fixing roller to the level optimal for melting the toner. By comparison, in the sleep mode, MFP 100 controls the temperature of the fixing roller to the level lower than in the standby mode, or performs no temperature control, to reduce power consumption. Thus, after MFP 100 enters the sleep mode, the temperature of the fixing roller gradually lowers over time. Once the fixing roller is lowered in temperature, it requires a certain period of time to return to the temperature optimal for melting the toner again. Thus, even if the sleep mode is released, the standby mode is attained only after a prescribed period of time.

Figure 4:
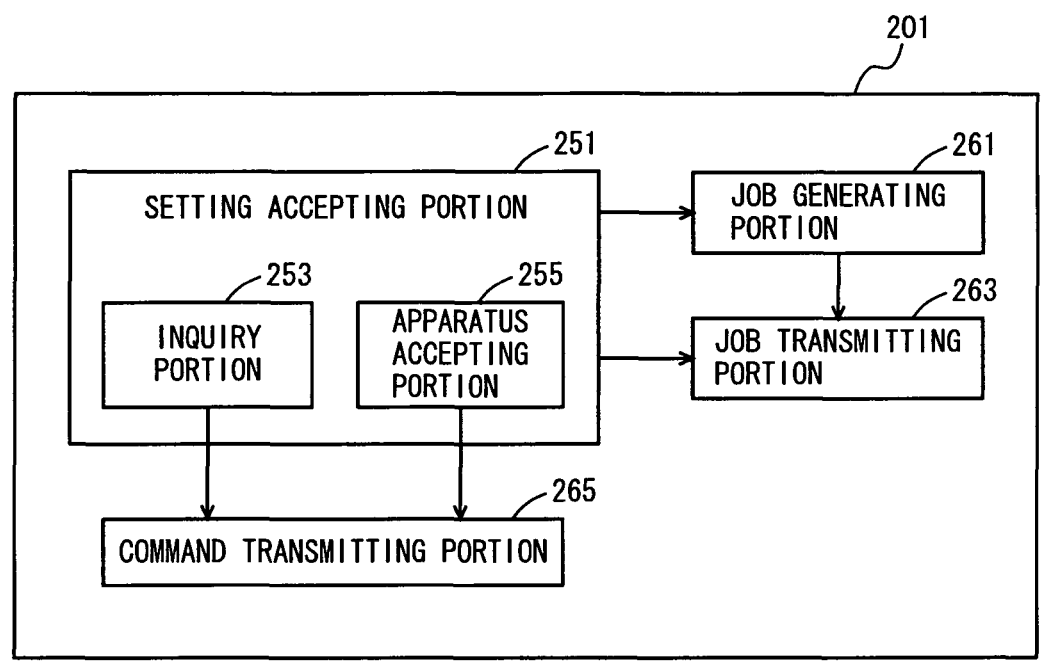
FIG. 4 is a first functional block diagram schematically showing the function of a CPU provided in the PC.

FIG. 4 is a first functional block diagram schematically showing the function of the CPU provided in the PC. Referring to FIG. 4, CPU 201 includes: a setting accepting portion 251 to accept setting of a print condition or the like; a job generating portion 261 to generate a print job; a job transmitting portion 263 to transmit the print job to MFP 100; and a command transmitting portion 265 to transmit a wake-up command.

Setting accepting portion 251 displays a print setting screen on display portion 213B, and accepts designation of the data to be printed, a print condition, and designation of the printer to be used for printing, which are input by the user to input portion 213A according to the print setting screen. Setting accepting portion 251 then outputs the information for identification of the data to be printed and the print condition to job generating portion 261, and outputs the identification information for identification of the printer to be used for printing to job transmitting portion 263. The print condition includes a password input by the user when the printing method is set to confidential printing.

Setting accepting portion 251 includes an inquiry portion 253 to inquire of the user whether to cause the printer used for printing to attain a printable state, and an apparatus accepting portion 255 to accept designation of the printer to be used for printing. The print setting screen will now be described.

Figure 5:
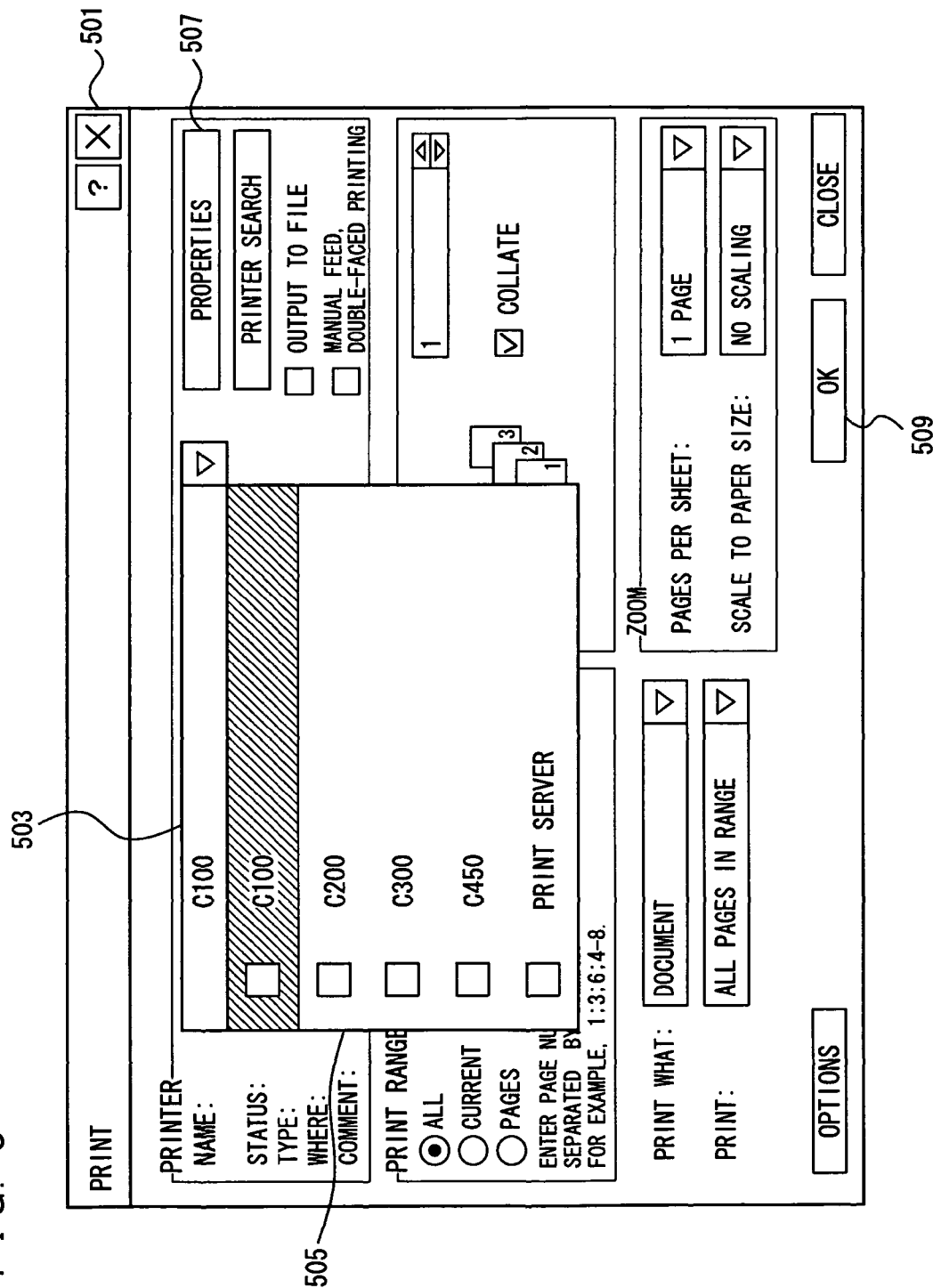
FIG. 5 is a first diagram showing an example of a print setting screen.

FIG. 5 is a first diagram showing an example of the print setting screen. Referring to FIG. 5, print setting screen 501 includes: an area 503 for inputting identification information of the printer to be used for printing; an area 505 for displaying a list of the identification information of the printers to which the print job can be transmitted; and a button 507 to instruct display of a detail setting screen. When the user operates the mouse of input portion 213A to move a pointer displayed on display portion 213B to one of a plurality of pieces of identification information displayed on area 505 and clicks the mouse, the identification information designated by the pointer is input to area 503. Correspondingly, apparatus accepting portion 255 accepts the identification information. Apparatus accepting portion 255 outputs the accepted identification information to command transmitting portion 265. Although the identification information is the name assigned to the printer in this example, it may be other than the name of the printer as long as it can identify the printer. For example, it may be the position information on network 2 assigned to the printer, such as an IP address or a MAC address. When button 507 is designated, a detail setting screen is displayed on display portion 213B. When OK button 509 is designated after the setting, a print job is generated and transmitted, which will be described later.

Figure 6:
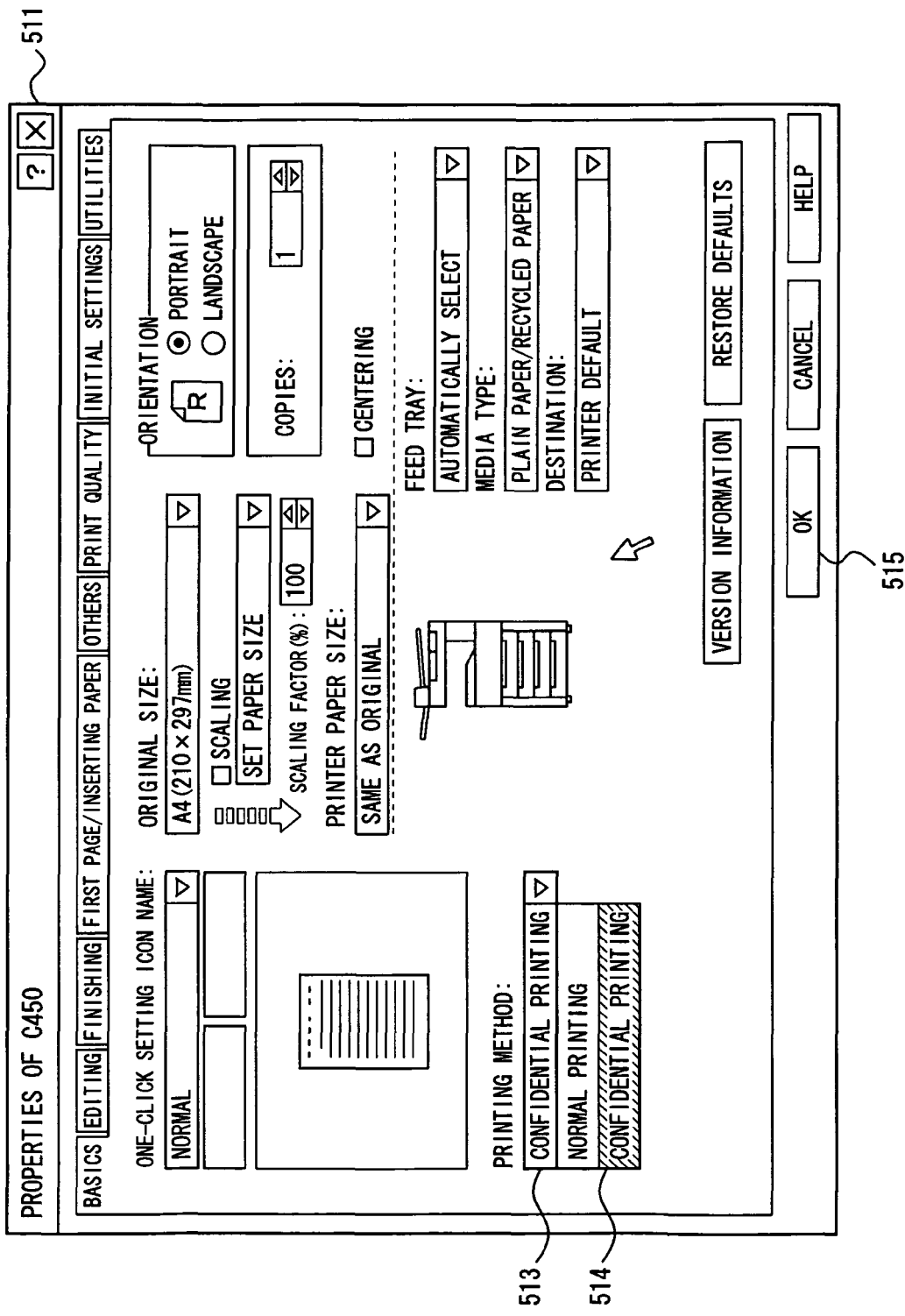
FIG. 6 is a diagram showing an example of a detail setting screen.

FIG. 6 shows an example of the detail setting screen. This screen is displayed when button 507 in FIG. 5 is designated. Referring to FIG. 6, detail setting screen 511 includes an area 513 for setting the printing method, and an area 514 on which options of the printing method are displayed. When the user operates the mouse of input portion 213A to move the pointer displayed on display portion 213B to one of the plurality of options of the printing method displayed in area 514 and clicks the mouse, the option of the printing method designated by the pointer is input to area 513. When OK button 515 is designated after the setting, the screen returns to the screen shown in FIG. 5. The options of the printing method include normal printing and confidential printing. Normal printing is the printing method where printing is carried out at the time when the printer receives the print data. Confidential printing is the printing method where upon reception of the print data, the printer temporarily stores the print data, and prints the same only after a prescribed instruction is input afterwards. The prescribed instruction may be, for example, an input of a password that matches the password received together with the print data. When confidential printing is input to area 513 as the printing method, setting accepting portion 251 sets the printing method, confidential printing, in the print condition.

Figure 7:
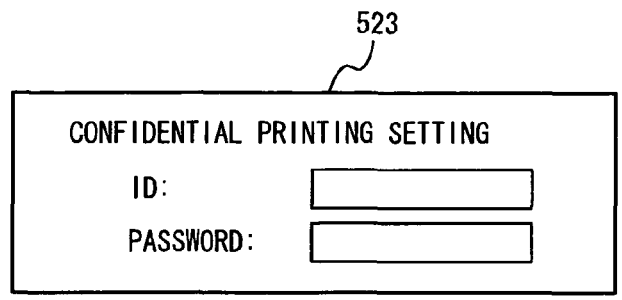
FIG. 7 is a diagram showing an example of a confidential print setting screen.

When confidential printing is set as the printing method in the print condition, setting accepting portion 251 displays a confidential printing setting screen on display portion 213B. FIG. 7 shows an example of the confidential printing setting screen. Referring to FIG. 7, confidential printing setting screen 523 includes an area for inputting an ID, and an area for inputting a password. The ID is information for identification of the print job.

Returning to FIG. 4, when the user inputs an ID and a password using the keyboard of input portion 213A according to the confidential printing setting screen, setting accepting portion 251 accepts the ID and the password from input portion 213A, and sets them in the print condition.

When confidential printing is set as the printing method in the print condition, inquiry portion 253 displays an inquiry screen inquiring whether to cause the printer to attain a printable state on display portion 213B, to thereby inquire whether to make the printer return to the standby mode.

Figure 8:
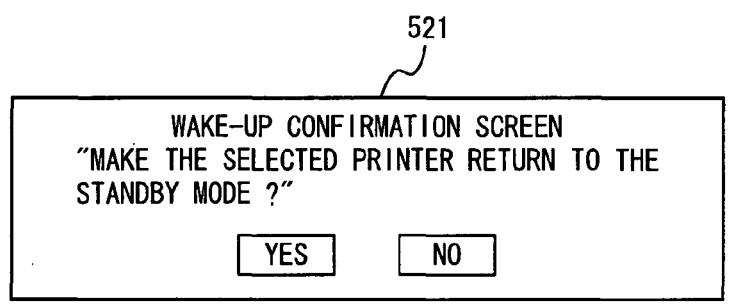
FIG. 8 is a diagram showing an example of an inquiry screen.

FIG. 8 shows an example of the inquiry screen. Referring to FIG. 8, the inquiry screen includes a message reading: "Make the selected printer return to the standby mode?", a button on which "YES" is written, and a button on which "NO" is written. When the "YES" button is designated, inquiry portion 253 accepts an instruction to switch the printer for use in printing to the standby mode. Upon reception of the instruction to switch the printer to the standby mode, inquiry portion 253 outputs a wake-up instruction to command transmitting portion 265.

When the wake-up instruction is input from inquiry portion 253, command transmitting portion 265 transmits a command (wake-up command), instructing switching of the printer for use in printing from the sleep mode to the standby mode, to the printer specified by the identification information input from apparatus accepting portion 255, i.e., MFP 100 in this case. Specifically, command transmitting portion 265 transmits the wake-up command to MFP 100 via communication I/F 211.

Job generating portion 261 generates a print job. Specifically, it converts the data accepted in setting accepting portion 251 to the print data described in PCL, according to the print condition. It then generates the print job including the print condition and the print data, and outputs the generated print job to job transmitting portion 263. Job transmitting portion 263 transmits the print job input from job generating portion 261 to the printer specified by the identification information input from setting accepting portion 251.

Figure 9:
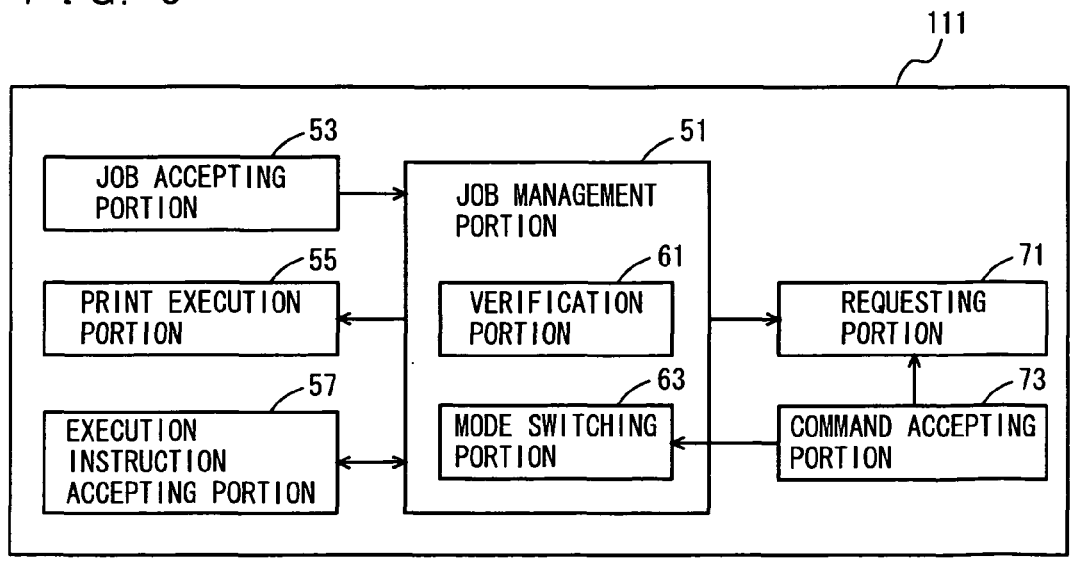
FIG. 9 is a first functional block diagram schematically showing the function of a CPU provided in the MFP.

FIG. 9 is a first functional block diagram schematically showing the function of the CPU provided in the MFP. Referring to FIG. 9, CPU 111 includes: a job accepting portion 53 to accept a print job; a job management portion 51 for management of the print job; a print execution portion 55 to cause image forming portion 30 to print the print data included in the print job in accordance with the print condition; an execution instruction accepting portion 57 to accept an execution instruction of the print job; a requesting portion 71 to request an input of a wake-up instruction; and a command accepting portion 73 to accept a wake-up command.

When data communication control portion 117 receives a print job, job accepting portion 53 accepts the print job from data communication control portion 117. Here, the print job is received from PC 200. Job accepting portion 53 outputs the accepted print job to job management portion 51.

If the print job output from job accepting portion 53 has its printing method set to confidential printing, job management portion 51 stores the print job in HDD 116. If the print job output from job accepting portion 53 has its printing method set to normal printing, job management portion 51 outputs a print instruction to execute the print job to print execution portion 55.

Execution instruction accepting portion 57 displays on display portion 114 an ID (identification information for identification of a print job) included in the print job stored in HDD 116 by job management portion 51, and when the user inputs an instruction to select one of the displayed IDs to operation portion 115, it accepts the selected ID. When accepting the ID, execution instruction accepting portion 57 displays a password input screen on display portion 114, and accepts the password input by the user to operation portion 115.

Job management portion 51 includes a verification portion 61 and a mode switching portion 63. Verification portion 61 verifies the password accepted by execution instruction accepting portion 57. Specifically, it reads from HDD 116 the print job specified by the ID accepted by execution instruction accepting portion 57, and compares the password included in the print job with the password accepted by execution instruction accepting portion 57. When they match, verification portion 61 determines that the password accepted by execution instruction accepting portion 57 is correct, whereas when they do not match, it determines that the password accepted by execution instruction accepting portion 57 is not correct.

When the password accepted by execution instruction accepting portion 57 is determined to be correct by verification portion 61, job management portion 51 outputs a print instruction including the relevant ID to print execution portion 55 on the condition that MFP 100 is in a standby mode, to cause print execution portion 55 to execute the print job specified by the ID. If MFP 100 is in the sleep mode before the print instruction is output to print execution portion 55, job management portion 51 outputs an instruction to switch from the sleep mode to the standby mode to mode switching portion 63. After MFP 100 attains the standby mode, job management portion 51 outputs the print instruction to print execution portion 55.

Mode switching portion 63 switches the operating mode of MFP 100 to either the sleep mode or the standby mode. In the case where MFP 100 is in the sleep mode before job management portion 51 outputs the print instruction to print execution portion 55 or at the time when command accepting portion 73 accepts a wake-up command, which will be described later, mode switching portion 63 switches the operating mode from the sleep mode to the standby mode.

In the sleep mode of MFP 100, if the print job accepted by job accepting portion 53 has its printing method set to normal printing, job management portion 51 inputs to mode switching portion 63 an instruction to switch the operating mode to the standby mode. On the other hand, if the print job accepted by job accepting portion 53 has its printing method set to confidential printing, job management portion 51 maintains the sleep mode, without instructing mode switching portion 63 to switch the operating mode to the standby mode. This is because, in the case of the print job set as confidential printing, the user may not print the print data immediately. In this manner, it is possible to reduce the power consumed by MFP 100 to attain the standby mode as well as the power consumed by MFP 100 without performing any operation after attaining the standby mode.

Upon reception of the print instruction including the print job from job management portion 51, print execution portion 55 controls image forming portion 30 to print the print data included in the print job according to the print condition. When a print instruction including the ID is input, print execution portion 55 reads the print job specified by the ID from HDD 116, and controls image forming portion 30 to print the print data included in the read print job according to the print condition.

When data communication control portion 117 receives a wake-up command, command accepting portion 73 accepts the wake-up command from data communication control portion 117. Here, data communication control portion 117 receives the wake-up command from PC 200. Command accepting portion 73 outputs the accepted wake-up command to mode switching portion 63. Upon reception of the wake-up command, mode switching portion 63 switches the operating mode to the standby mode if it is set in the sleep mode. Specifically, in order to make MFP 100 attain the printable state, it starts the temperature control of the fixing roller provided in image forming portion 30, or, it causes image forming portion 30 to start execution of image stabilizing processing. In this manner, the operating mode is switched to the standby mode after the reception of the wake-up command. Accordingly, for the print job received from PC 200 that transmitted the relevant wake-up command and having its printing method set to confidential printing, it is possible to start printing as quickly as possible after the input of the execution instruction.

Figure 10:
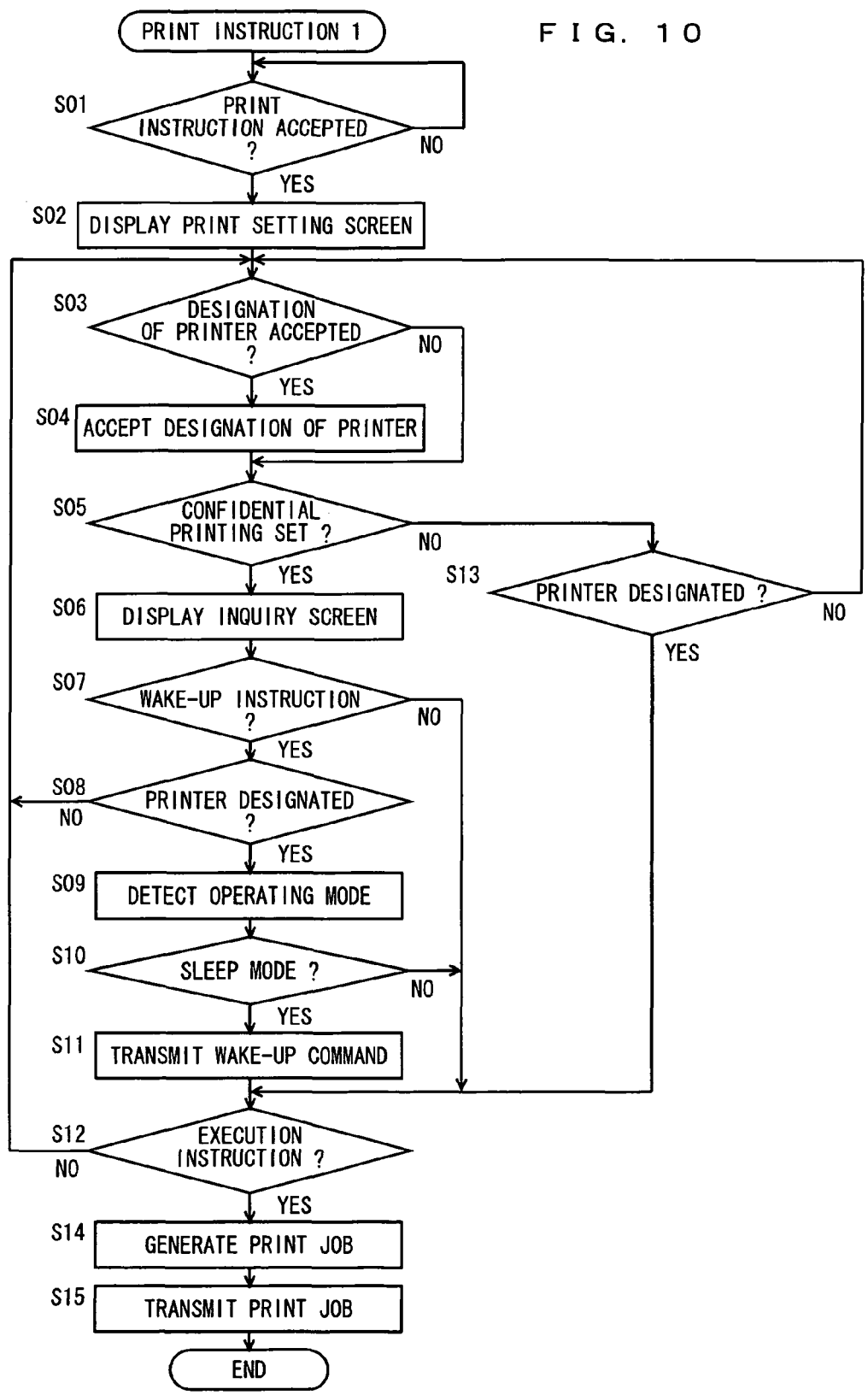
FIG. 10 is a first flowchart illustrating an example of the flow of print instruction processing.

FIG. 10 is a flowchart illustrating an example of the flow of print instruction processing. The print instruction processing is carried out by CPU 201 of PC 200 as CPU 201 executes the control program. Referring to FIG. 10, CPU 201 determines whether a print instruction has been accepted (step S01). CPU 201 is in a standby state until the print instruction is accepted (NO in step S01), and once the print instruction is accepted, the process proceeds to step S02. Here, the print instruction corresponds, e.g., to designation of a print button displayed on display portion 213B.

In step S02, the print setting screen, shown in FIG. 5, is displayed on display portion 213B. This allows the user to input the settings to input portion 213A according to the print setting screen. CPU 201 accepts the settings including the print condition input to input portion 213A.

In step S03, it is determined whether designation of the printer for use in printing has been accepted. If the designation of the printer is accepted, the process proceeds to step S04; otherwise, the process proceeds to step S05, skipping step S04. Specifically, it is determined, for example, whether identification information has been input to area 503 for inputting the identification information of the printer provided on the print setting screen shown in FIG. 5. If the identification information is input to area 503, the process proceeds to step S04; otherwise, the process proceeds to step S05, skipping step S04. In step S04, the identification information input to area 503 is accepted, and sets the printer specified by the identification information as the designated printer.

In step S05, it is determined whether the printing method has been set to confidential printing. If so, the process proceeds to step S06; otherwise, the process proceeds to S13. Specifically, it is determined whether confidential printing as the option of the printing method has been input to area 513 for setting the printing method on detail setting screen 511 shown in FIG. 6. It may be possible to determine that confidential printing has been set as the printing method on the condition that an ID and a password are input on the confidential printing setting screen displayed on display portion 213B, which is the screen 203 shown in FIG. 7.

In step S06, an inquiry screen is displayed on display portion 213B to inquire whether to switch the printer for use in printing to the standby mode. Specifically, the inquiry screen 521, shown in FIG. 8, is displayed.

It is then determined whether a wake-up instruction indicating switching of the printer for use in printing to the standby mode has been input (step S07). The input of the wake-up instruction corresponds to designation of a button in inquiry screen 521 having the characters "YES" written thereon. If the wake-up instruction is input, the process proceeds to step S08; otherwise, the process proceeds to step S12.

In step S08, it is determined whether the printer has been designated. Specifically, it is determined whether the printer has already been designated in step S04. If so, the process proceeds to step S09; otherwise, the process returns to step S03, because that the printer is not designated means that the destination of the print job is unclear.

In step S09, the operating mode of the designated printer, i.e., MFP 100 in this case, is detected. For example, MIB (Management Information Base) is received from MFP 100 to detect the relevant state. It is determined whether the designated printer is in the sleep mode (step S10). If so, the process proceeds to step S11; otherwise, the process proceeds to step S12.

In step S11, the wake-up command is transmitted to the designated printer. When receiving the wake-up command, the designated printer, i.e., MFP 100, has its operating mode switched to the standby mode, and thus, the user of PC 200 can effectively use the time required for the operating mode to be switched from the sleep mode to the standby mode for the time for setting the print condition or for the time for moving from PC 200 to the designated printer, MFP 100. Accordingly, before the user arrives in front of MFP 100, MFP 100 will have been switched to the standby mode, or it will be switched to the standby mode shortly after the user arrives in front of MFP 100. As a result, the user can cause MFP 100 to print out the print job set as confidential printing immediately after his/her arrival in front of MFP 100, or the waiting time for the printer to print out the job can be shortened.

In step S12, it is determined whether an execution instruction has been input. If so, the process proceeds to step S14; otherwise, the process returns to step S03. The execution instruction refers to the instruction to confirm the printer for use in printing and the data to be printed, and to cause the relevant printer to print the data according to the print condition. In step S14, a print job is generated, and in step S15, the print job is transmitted to the printer designated in step S04.

Meanwhile, in step S13, it is determined whether the printer for use has been designated, similarly as in step S08. If the printer has been designated, the process proceeds to step S12; otherwise, the process returns to step S03. It is noted that the processing the same as in steps S09 through S11 may be executed during the time before accepting the execution instruction, to transmit a wake-up command to the printer if the designated printer is in the sleep mode. This allows the printer to be set to the standby mode earlier, to thereby eliminate or reduce the waiting time for the user.

Figure 11:
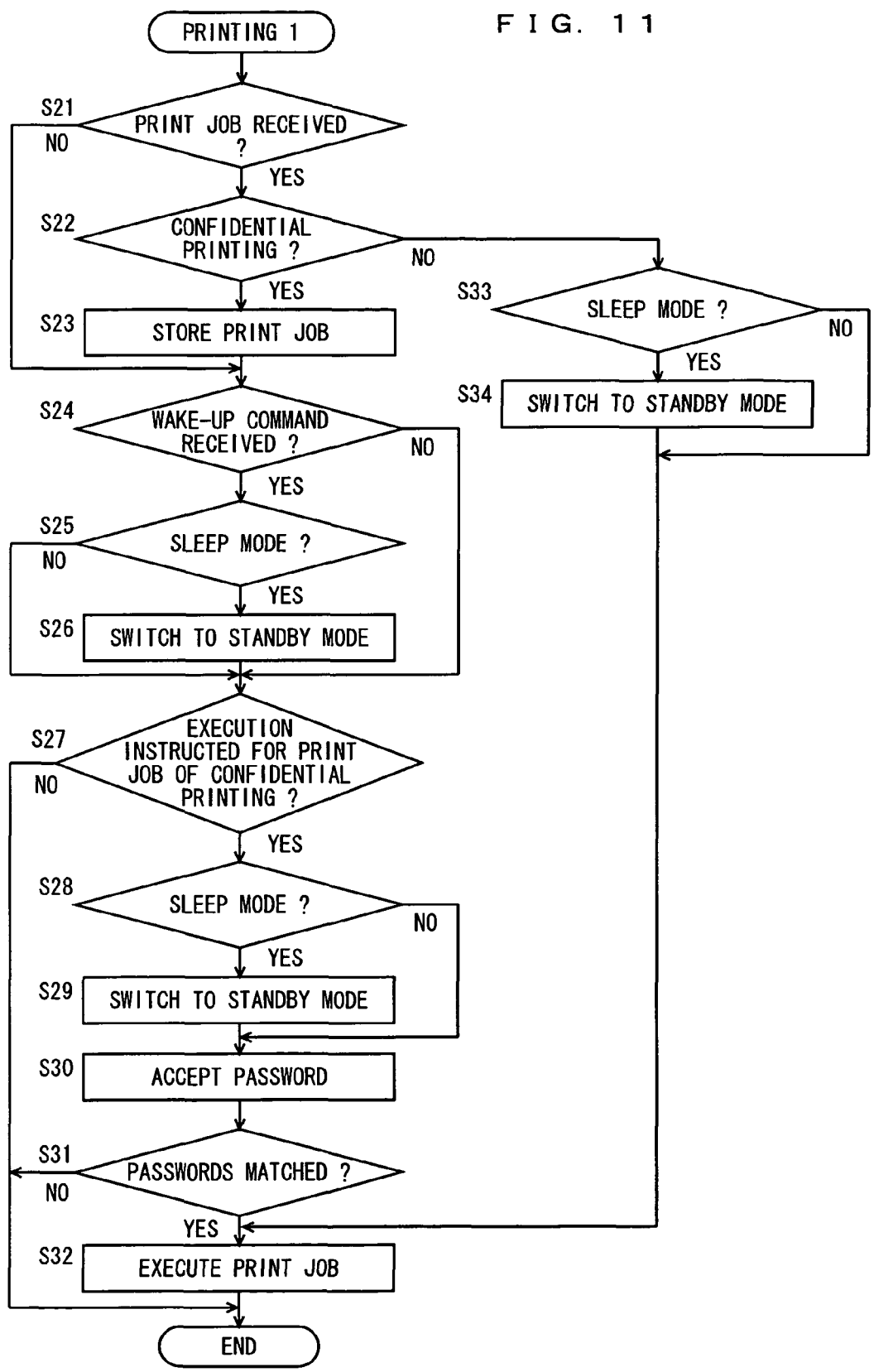
FIG. 11 is a first flowchart illustrating an example of the flow of printing processing.

FIG. 11 is a first flowchart illustrating an example of the flow of printing processing. The printing processing is carried out by CPU 111 of MFP 100 as CPU 111 executes the control program. Referring to FIG. 11, CPU 111 determines whether a print job has been received (step S21). When data communication control portion 117 has received a print job, the process proceeds to step S22; otherwise, the process proceeds to step S24. In step S24, it is determined whether a wake-up command has been received. If so, the process proceeds to step S25; otherwise, the process proceeds to step S27. In step S27, it is determined whether an execution instruction to execute a print job of confidential printing has been accepted. If the execution instruction has been input, the process proceeds to step S28; otherwise, the process is terminated. In other words, the printing processing is carried out when either the print job or the wake-up command has been received, or when the execution instruction has been accepted.

In step S22, it is determined whether the received print job has its printing method set to confidential printing. If the printing method is set to confidential printing, the process proceeds to step S23; otherwise, the process proceeds to step S33. In step S23, the print job received in step S21 is temporarily stored in HDD 116. This is because, in order for the print job having its printing method set to confidential printing to be executed, a password needs to be input, and thus, the print job is stored until the password is input.

If the wake-up command is received in step S24, it is determined whether MFP 100 is in the sleep mode (step S25). If it is in the sleep mode, the process proceeds to step S26; otherwise, the process proceeds to step S27, skipping step S26, because the wake-up command is a command to switch the operating mode from the sleep mode to the standby mode. In step S26, the operating mode is switched to the standby mode.

In step S27, it is determined whether the execution instruction has been accepted. The execution instruction includes, e.g., designation of the print job stored in HDD 116. For example, the IDs (identification information for identification of print jobs) included in the print jobs stored in HDD 116 are displayed on display portion 114, and the user's instruction to select one of the IDs is accepted, to accept the execution instruction. When the execution instruction is accepted, it is determined whether MFP 100 is in the sleep mode (step S28). If so, the process proceeds to step S29; otherwise, the process proceeds to step S30, skipping step S29. In step S29, the operating mode is switched to the standby mode.

In step S30, a password is accepted. An input screen for input of password is displayed on display portion 114, to accept the password input by the user to operation portion 115. The accepted password is compared with the password included in the print job specified by the ID designated in step S27, to determine whether they match (step S31). If the passwords match with each other, the process proceeds to step S32; otherwise, the process is terminated. This ensures that the print job is printed out by the instruction of only the user who knows the password. Since the person who does not know the password cannot cause the print job to be executed, it is possible to prevent the confidential information included in the print data from being revealed to a third party. In step S32, the print job specified by the ID designated in step S27 is executed, and the process is terminated.

When the wake-up command is received when MFP 100 is in the sleep mode, the operating mode of MFP 100 is switched to the standby mode even if a print job has not been received. This allows the user of PC 200 to effectively use the time required for the operating mode to be switched to the standby mode for the time for setting the print condition and the like or for the time for moving from PC 200 to the designated printer, MFP 100. Accordingly, before the user arrives in front of MFP 100, MFP 100 will have been switched to the standby mode, or it will be switched to the standby mode shortly after the user's arrival in front of MFP 100. Thus, the user can cause MFP 100 to print out the print job set as confidential printing immediately after his/her arrival in front of MFP 100, or the waiting time for the printer to print out the job can be shortened.

Further, when MFP 100 receives a print job having its printing method set to confidential printing while it is in the sleep mode, the sleep mode is maintained, instead of being switched to the standby mode. This can reduce the power consumed as MFP 100 is switched to the standby mode to be ready for printing, and the power consumed as MFP 100 performs no operation after attaining the printable state.

<Second Embodiment>

Figure 12:
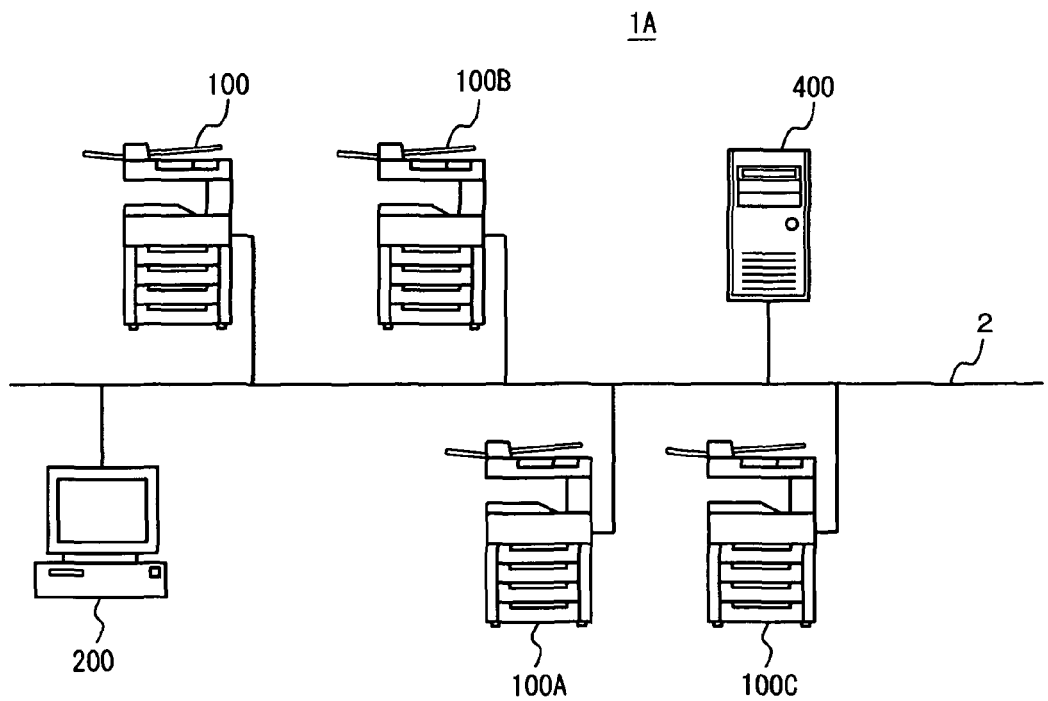
FIG. 12 is a schematic diagram of a printing system according to a second embodiment of the present invention.

A printing system according to a second embodiment of the present invention will now be described. FIG. 12 schematically shows a printing system according to the second embodiment. Referring to FIG. 12, a printing system 1A of the second embodiment includes MFPs 100, 100A, 100B, and 100C, PC 200, and a print server 400, which are connected to network 2. Print server 400 is a common computer with a well-known hardware configuration, and thus, description thereof will not be provided here.

In printing system 1A of the second embodiment, a print job is firstly transmitted from PC 200 to print server 400, and print server 400 manages the print job. Printing system 1A of the second embodiment differs from printing system 1 of the first embodiment in that, while printing system 1 of the first embodiment adopts a push-type printing method where print data is firstly transmitted to the printer, printing system 1A of the second embodiment adopts a pull-type printing method where the print job is stored in print server 400, and at the time of printing out, one of MFPs 100, 100A, 100B and 100C operated by the user acquires the print job from print server 400. In the following, the printing system of the second embodiment will be described mainly for the points different from the printing system of the first embodiment. MFPs 100, 100A, 100B and 100C of the second embodiment are identical in function to each other, and thus, MFP 100 will be explained representatively in the following, unless otherwise stated.

Figure 13:
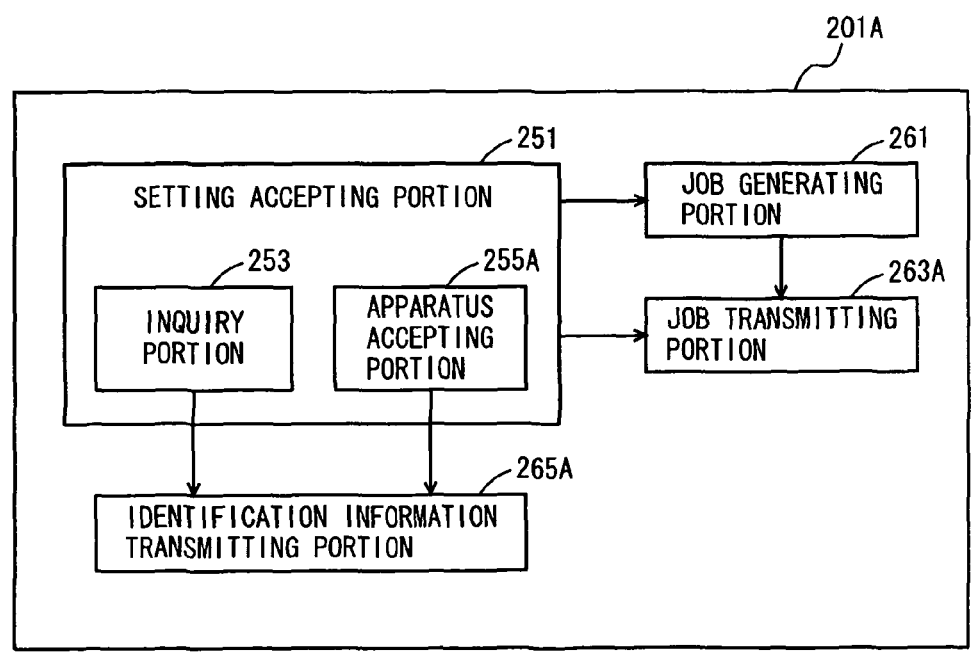
FIG. 13 is a second functional block diagram schematically showing the function of the CPU provided in the PC.

FIG. 13 is a second functional block diagram schematically showing the function of the CPU provided in the PC. Referring to FIG. 13, the functional blocks are different from those in FIG. 4 in that an identification information transmitting portion 265A has been added in place of command transmitting portion 265, and apparatus accepting portion 255A and job transmitting portion 263A have been modified.

Figure 14:
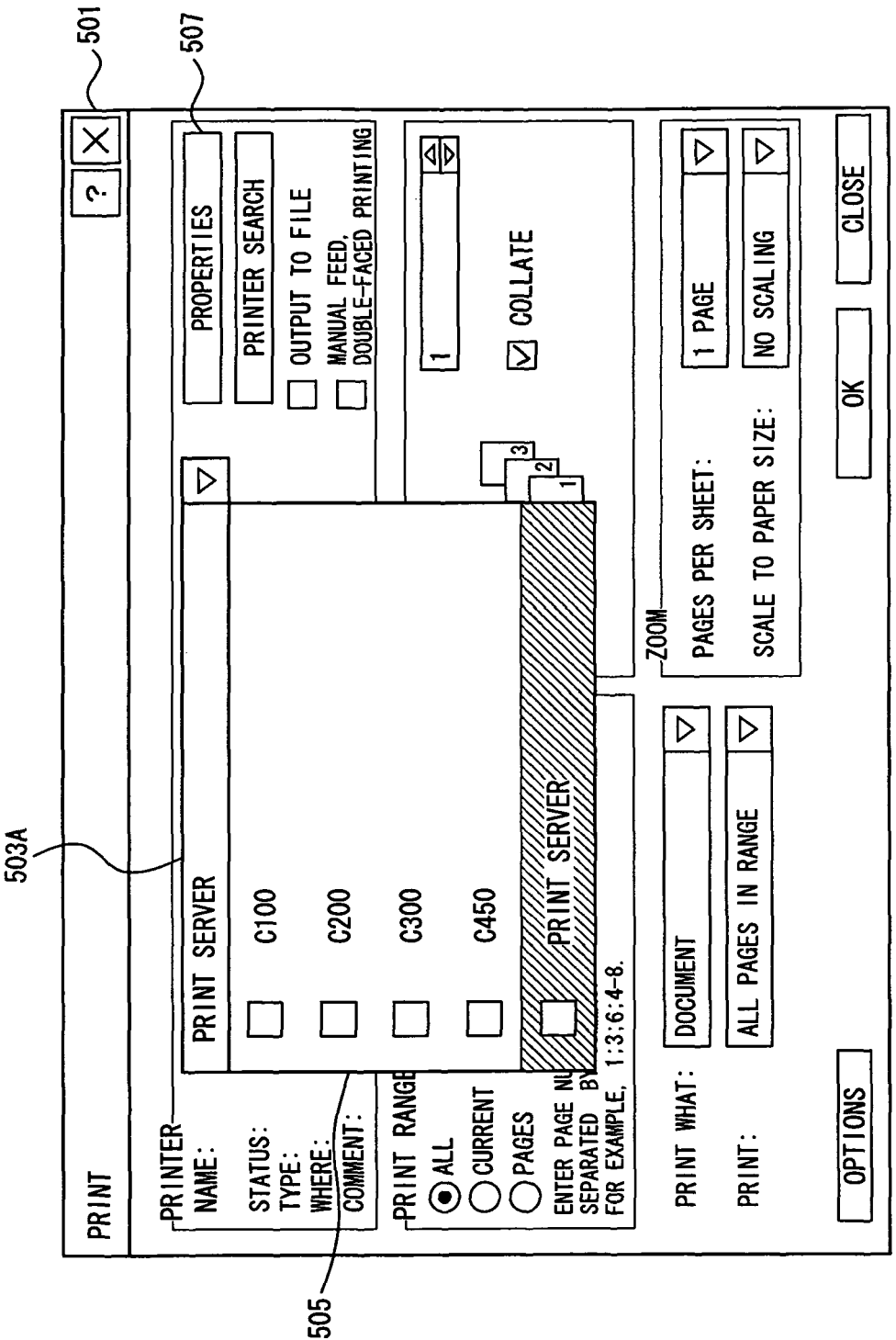
FIG. 14 is a second diagram showing an example of the print setting screen.

FIG. 14 is a second diagram showing an example of the print setting screen. FIG. 14 shows the case where, in print setting screen 501, the identification information of print server 400 is designated in area 505 displaying a list of identification information of the printers to which the print job can be transmitted, and the identification information of print server 400 is input to the area 503A. In this case, setting accepting portion 251 shown in FIG. 13 accepts the identification information of print server 400, and outputs the identification information to job transmitting portion 263A.

Further, when the identification information of print server 400 is input to area 503A, setting accepting portion 251 displays a printer selection screen on display portion 213B. FIG. 15 shows an example of the printer selection screen. Referring to FIG. 15, the printer selection screen is a screen displaying a list of identification information of printers to which the print job can be transmitted, and includes a plurality of check boxes corresponding respectively to the listed identification information. When one of the check boxes is designated by the mouse, the printer specified by the identification information corresponding to the designated check box is selected.

Apparatus accepting portion 255A accepts the identification information corresponding to the designated check box on the printer selection screen, and outputs the identification information to identification information transmitting portion 265A. When the identification information is input from apparatus accepting portion 255A and the wake-up instruction is input from inquiry portion 253, identification information transmitting portion 265A transmits an instruction to transmit a wake-up command and the relevant identification information to print server 400. Upon reception of the identification information, print server 400 transmits a wake-up command to the printer specified by the identification information. Job transmitting portion 263A transmits the print job input from job generating portion 261 to print server 400.

FIG. 16 is a functional block diagram schematically showing the function of the print server. Referring to FIG. 16, a CPU 450 provided in print server 400 includes: a job receiving portion 401 to receive a print job; a job management portion 405 for management of the print job; a job request receiving portion 403 to receive a request to transmit a print job from one of MFPs 100, 100A, 100B, and 100C; an identification information receiving portion 409 to receive the identification information transmitted from PC 200; a command transmitting portion 411 to transmit a wake-up command to the printer specified by the identification information; and a job transmitting portion 407.

Job receiving portion 401 receives a print job, and outputs the print job to job management portion 405. Job management portion 405 stores the print job output from job receiving portion 401 in a storage provided in print server 400, for example, HDD 116.

When receiving a request to transmit a list of jobs ("list transmission request") from one of MFPs 100, 100A, 100B, and 100C, job request receiving portion 403 transmits the IDs (identification information for identification of print jobs) included in the print jobs stored in the HDD to the MFP that transmitted the list transmission request. Here, the case where MFP 100 has transmitted the list transmission request is explained. Thereafter, when receiving an ID from MFP 100, job request receiving portion 403 outputs the ID to job transmitting portion 407. Job transmitting portion 407 reads the print job specified by the ID from the HDD, and transmits the print job to MFP 100 that had transmitted the ID.

Identification information receiving portion 409 receives an instruction to transmit a wake-up command and identification information for identifying one of MFPs 100, 100A, 100B, and 100C, from PC 200 that had transmitted the print job, and outputs the identification information to command transmitting portion 411. Command transmitting portion 411 transmits the wake-up command to the printer specified by the identification information input from identification information receiving portion 409.

Figure 17:
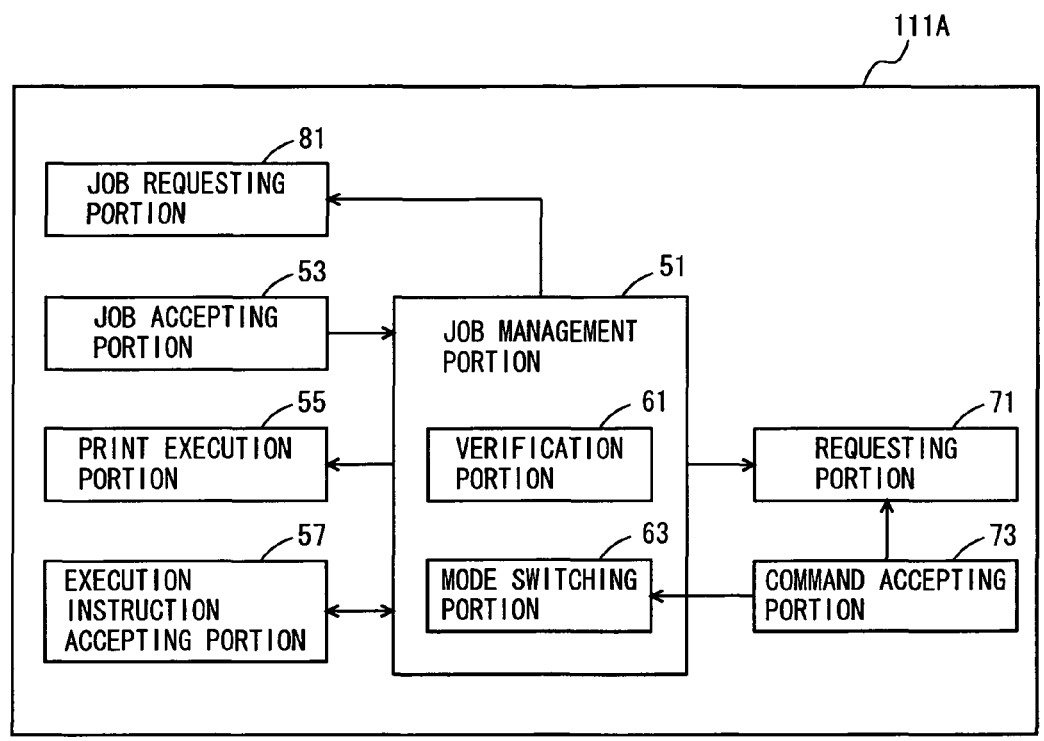
FIG. 17 is a second functional block diagram schematically showing the function of the CPU provided in the MFP.

FIG. 17 is a second functional block diagram schematically showing the function of the CPU provided in the MFP. Referring to FIG. 17, the function of this CPU differs from that of CPU 111 of MFP 100 of the first embodiment shown in FIG. 9 in that a job requesting portion 81 has been added. When an acquisition request to acquire the print job stored in print server 400 is input by the user via operation portion 115, job requesting portion 81 transmits the acquisition request to print server 400. Thereafter, it receives the ID transmitted from print server 400, and displays the same on display portion 114. When the user designates the displayed ID, it transmits a request to transmit the print job corresponding to the relevant ID to print server 400. In response to this transmission request, the print server transmits the print job specified by the ID, and the print job is received by data communication control portion 117 and accepted by job accepting portion 53.

Figure 18:
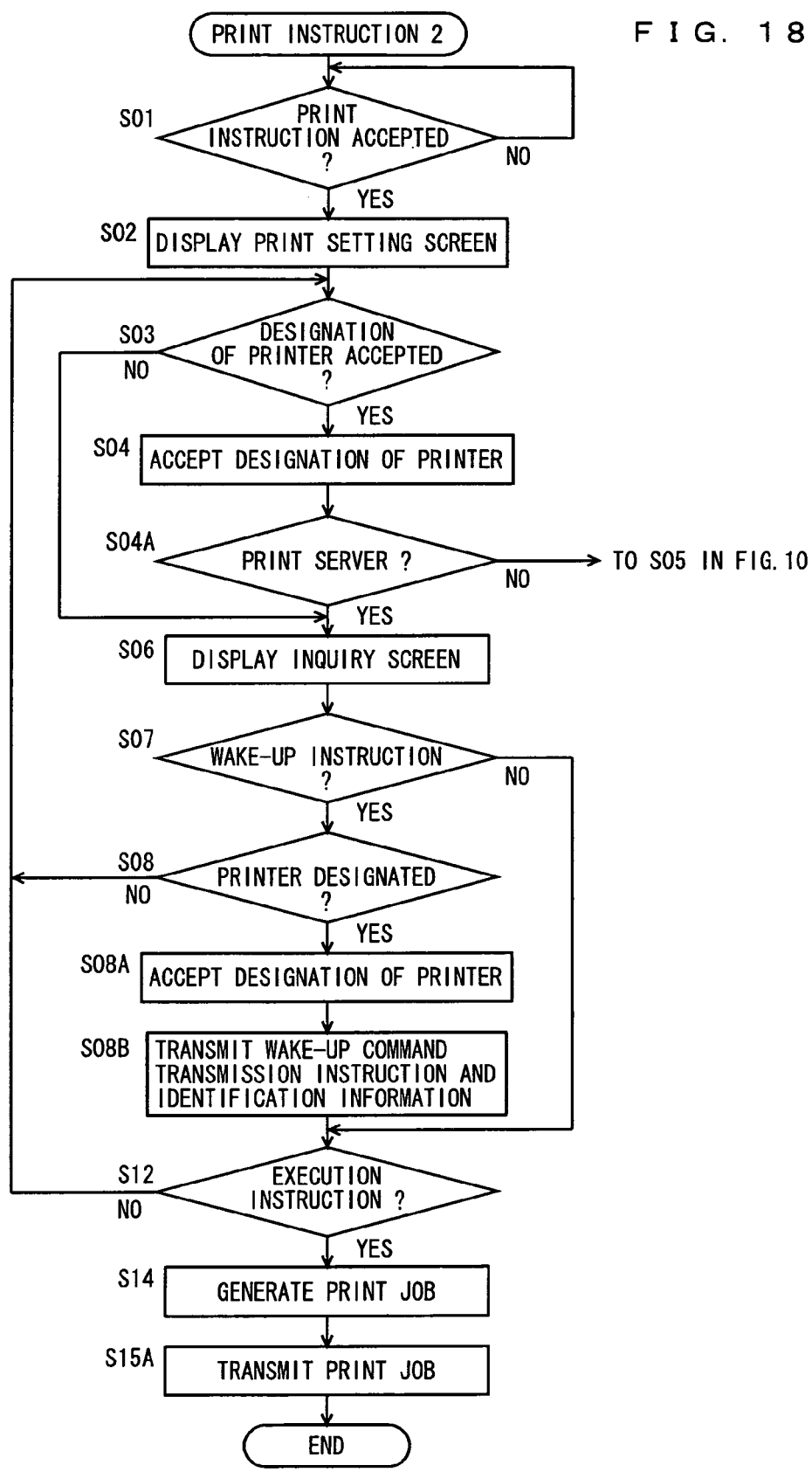
FIG. 18 is a second flowchart illustrating an example of the flow of the print instruction processing.

FIG. 18 is a second flowchart illustrating an example of the flow of the print instruction processing. The print instruction processing is carried out by CPU 201A of PC 200 of the second embodiment as CPU 201A executes the control program. Referring to FIG. 18, the print instruction processing of the second embodiment differs from that of the first embodiment shown in FIG. 10 in that steps S05, S09 through S11 and S13 have been deleted, step S04A has been added following step S04, steps S08A and S08B have been added following step S08, and step S15A has been modified. The other processing is identical to that of the first embodiment, and thus, description thereof will not be repeated here.

In step S03, it is determined whether designation of a printer has been accepted. If so, the process proceeds to step S04; otherwise, the process proceeds to step S06. In step S04, the designation of the printer is accepted, and in step S04A, it is determined whether the designated printer is the print server. If the print server has been designated, the process proceeds to step S06. If the designated printer is not the print server, the process proceeds to step S05 in FIG. 10, and the processing identical to that following step S05 is executed.

If it is determined in step S08 that the printer has been designated, the process proceeds to step S08A; otherwise, the process returns to step S03. When the process proceeds to step S08A, the designated printer is the print server. In step S08A, the printer selection screen is displayed on display portion 213B, to accept designation of the printer to be used for printing. In the following step S08B, an instruction to transmit a wake-up command and the identification information of the printer designated in step S08A as the printer used for printing are transmitted to print server 400. In print server 400, the wake-up command is transmitted to the printer specified by the received identification information. If the printer designated by the user is in the sleep mode at this time point, the designated printer is switched to the standby mode. In step S15A, the print job is transmitted to print server 400, and the process is terminated.

Figure 19:
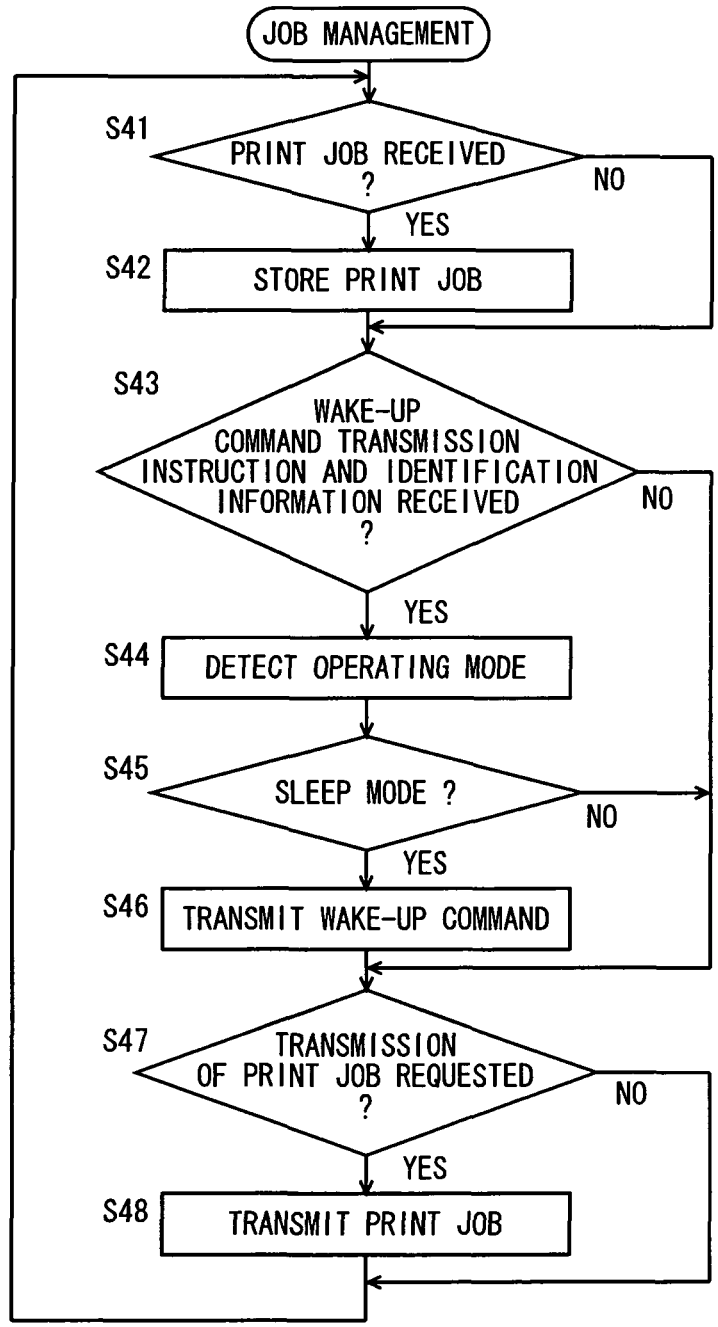
FIG. 19 is a flowchart illustrating an example of the flow of job management processing.

FIG. 19 is a flow chart illustrating an example of the flow of job management processing. The job management processing is carried out by CPU 450 provided in print server 400 as CPU 450 executes the control program. CPU 450 of print server 400 determines whether a print job has been received from PC 200 (step S41). If so, the process proceeds to step S42; otherwise, the process proceeds to step S43. In step S42, the received print job is stored in a storage such as the HDD.

In step S43, it is determined whether the instruction to transmit the wake-up command and the identification information have been received from PC 200. If the wake-up command transmission instruction and the identification information are received, the process proceeds to step S44; otherwise, the process proceeds to step S47. In step S44, the operating mode of the printer specified by the identification information is detected. For example, the operating mode is detected by receiving MIB from the printer specified by the identification information. It is then determined whether the detected operating mode is the sleep mode (step S45). If so, the process proceeds to step S46, while if it is not the sleep mode, the process proceeds to step S47. In step S46, the wake-up command is transmitted to the printer specified by the identification information.

It is determined whether a request to transmit a print job has been received from one of MFPs 100, 100A, 100B, and 100C (step S47). If the print job transmission request is received, the process proceeds to step S48; otherwise, the process returns to step S41. The transmission request includes the ID for specifying the print job. Here, the case where the print job transmission request is received from MFP 100 is explained as an example. In step S48, the print job specified by the ID included in the transmission request is read from the HDD, and the print job is transmitted to MFP 100 that had transmitted the transmission request.

Figure 20:
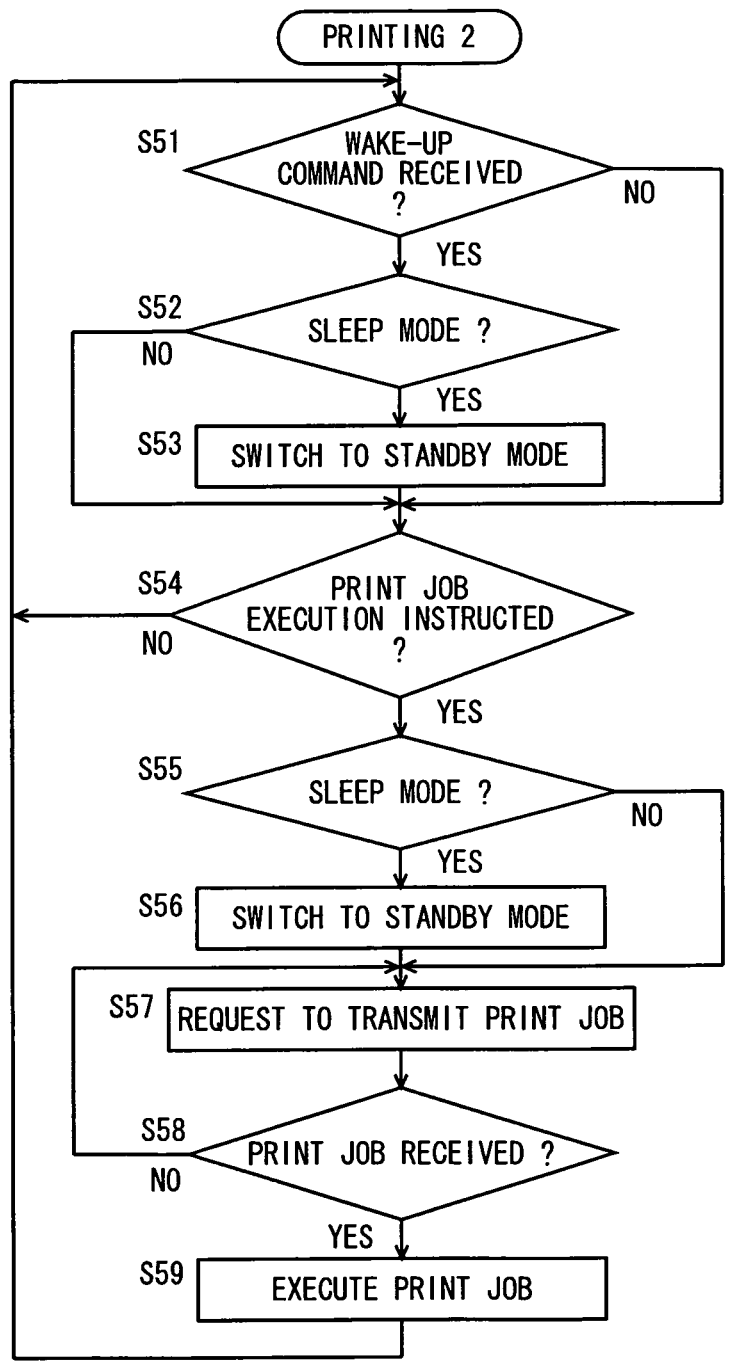
FIG. 20 is a second flowchart illustrating an example of the flow of the printing processing.

FIG. 20 is a second flowchart illustrating an example of the flow of the printing processing. The printing processing is carried out by CPU 111A of MFP 100 of the second embodiment as CPU 111A executes the control program. Referring to FIG. 20, the processing in steps S51 through S53 is identical to the processing in steps S24 through S26 shown in FIG. 11. Thus, upon reception of the wake-up command from print server 400, MFP 100 is switched to the standby mode if it is in the sleep mode at that time.

In step S54, it is determined whether an execution instruction of the print job stored in print server 400 has been accepted. If the execution instruction is accepted, the process proceeds to step S55; otherwise, the process returns to step S51. The execution instruction includes the process of receiving a list of IDs of the plurality of print jobs stored in print server 400, the process of displaying the list of the IDs, and the process of selecting one of the displayed IDs.

In step S55, it is determined whether MFP 100 is in the sleep mode, and if so, it is switched to the standby mode (step S56), and the process proceeds to step S57. If it is not in the sleep mode, the process proceeds to step S57. In step S57, a request to transmit a print job is transmitted to print server 400. The transmission request includes the ID selected in step S54. It is then determined whether the print job has been received from print server 400 (step S58). If the print job is received, the process proceeds to step S59; otherwise, the process returns to step S57. In step S59, the print job received in step S58 is executed, and the process returns to step S51.

As described above, according to printing system 1A of the second embodiment, print server 400 controls MFPs 100, 100A, 100B, and 100C serving as the image forming apparatuses. When the user sets the printing method to confidential printing in PC 200, the print job is transmitted to print server 400 and, at the same time, an inquiry screen inquiring which one of MFPs 100, 100A, 100B, and 100C is to be used for printing is displayed on display portion 213B. When the user designates, e.g., MFP 100 from among MFPs 100, 100A, 100B, and 100C, the identification information for identifying MFP 100 is transmitted to print server 400.

Meanwhile, when print server 400 receives the identification information, it transmits a wake-up command to MFP 100, and therefore, MFP 100 is switched to the standby mode if it is in the sleep mode. Further, when the user operates MFP 100 to input to MFP 100 an execution instruction designating the print job for which confidential printing has been set in PC 200, MFP 100 receives the relevant print job from print server 400 for printing. Thus, after the user sets the confidential printing at PC 200 and before he/she moves to MFP 100, MFP 100 will be switched to the standby mode. Accordingly, it is possible for the user to immediately start the execution of the print job having the printing method set to confidential printing.

On the other hand, MFP 100 is maintained in the sleep mode unless the wake-up command is received, which saves power consumption.

While printing systems 1, 1A have been described in the above embodiments, the present invention may of course be understood as a control method or a control program of an image forming apparatus that causes a computer to execute the processing illustrated in FIG. 10, 18, or 19. Further, the present invention may of course be understood as a control method or a control program that causes an image forming apparatus to execute the processing illustrated in FIG. 11 or 20.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device for controlling an image forming apparatus having operating modes of a standby mode ready for printing and a sleep mode unready for printing and consuming less power than in said standby mode, the control device comprising:
   a setting portion to accept setting for printing by a user;
   a generating portion to generate a print job based on said accepted setting;
   a transmitting portion to transmit said generated print job to said image forming apparatus;
   a confidential printing setting portion included in said setting portion, to set for confidential printing where printing is performed only after reception of a prescribed instruction; and
   a control portion to determine that the user sets the confidential printing by the confidential printing setting portion, and to inquire of said user whether to switch the operating mode of said image forming apparatus to said standby mode in response to the determination that the user has set the confidential printing by the confidential printing setting portion, to control to maintain the operating mode of said image forming apparatus in said sleep mode on the condition that an instruction not to switch the operating mode to standby mode is accepted in response to said inquiry, and to control to switch the operating mode of said image forming apparatus to said standby mode on the condition that an instruction to switch the operating mode to said standby mode is accepted in response to said inquiry.

2. The control device according to claim 1, wherein said control portion includes a transmitting portion to transmit to said image forming apparatus a command instructing switching of the operating mode to said standby mode.

3. The control device according to claim 1, wherein
   said setting portion includes an apparatus designation portion to accept designation of said image forming apparatus from among a plurality of image forming apparatuses, and
   said control portion controls said designated image forming apparatus.

4. A control method executed in a control device for controlling an image forming apparatus having operating modes of a standby mode ready for printing and a sleep mode unready for printing and consuming less power than in said standby mode, comprising the steps of:

accepting setting for printing by a user, wherein said setting can include setting for confidential printing where printing is performed only after reception of a prescribed instruction;

generating a job based on said accepted setting;

transmitting said generated job to said image forming apparatus;

determining that the user sets the confidential printing;

inquiring of said user whether to switch the operating mode of said image forming apparatus to said standby mode in response to the determination that the user has set the confidential printing;

controlling, on the condition that an instruction to switch the operating mode to said standby mode is accepted in response to said inquiry, to switch the operating mode of said image forming apparatus to said standby mode when the setting of said confidential printing is accepted in said step of accepting the setting; and controlling, on the condition that an instruction not to switch the operating mode to said standby mode is accepted in response to said inquiry, to maintain the operating mode of said image forming apparatus in said sleep mode when the setting of said confidential printing is accepted in said step of accepting the setting.

5. The control method according to claim 4, wherein said step of controlling to switch the operating mode of said image forming apparatus to said standby mode includes the step of transmitting a command instructing switching of the operating mode to said standby mode to said image forming apparatus.

6. The control method according to claim 4, wherein said step of accepting the setting includes the step of accepting designation of said image forming apparatus from among a plurality of image forming apparatuses, and said step of controlling includes the step of controlling said designated image forming apparatus.

7. A control program for a control device for controlling an image forming apparatus having operating modes of a standby mode ready for printing and a sleep mode unready for printing and consuming less power than in said standby mode, the control program being embodied on a non-transitory computer readable medium for causing said control device to execute processing comprising the steps of:

accepting setting for printing by a user, wherein said setting can include setting for confidential printing where printing is performed only after reception of a prescribed instruction;

generating a job based on said accepted setting;

transmitting said generated job to said image forming apparatus;

determining that the user sets the confidential printing;

inquiring of said user whether to switch the operating mode of said image forming apparatus to said standby mode in response to the determination that the user has set the confidential printing;

when the setting of said confidential printing is accepted in said step of accepting the setting, controlling, on the condition that an instruction to switch the operating mode to said standby mode is accepted in response to said inquiry, to switch the operating mode of said image forming apparatus to said standby mode, and controlling, on the condition that an instruction not to switch the operating mode to said standby mode is accepted in response to said inquiry, to maintain the operating mode of said image forming apparatus in said sleep mode.

8. The control program according to claim 7, wherein said step of controlling to switch the operating mode of said image forming apparatus to said standby mode includes the step of transmitting a command instructing switching of the operating mode to said standby mode to said image forming apparatus.

9. The control program according to claim 7, wherein said step of accepting the setting includes the step of accepting designation of said image forming apparatus from among a plurality of image forming apparatuses, and said step of controlling includes the step of controlling said designated image forming apparatus.

* * * * *